US011836297B2

(12) United States Patent
Smith et al.

(10) Patent No.: US 11,836,297 B2
(45) Date of Patent: Dec. 5, 2023

(54) KEYBOARD WITH CAPACITIVE KEY POSITION, KEY MOVEMENT, OR GESTURE INPUT SENSORS

(71) Applicant: Apple Inc., Cupertino, CA (US)

(72) Inventors: John Stephen Smith, San Jose, CA (US); David S. Graff, Albany, CA (US); Nicolas M. Golzio, Montreal (CA); Shahrzad Pouryayevali, Los Gatos, CA (US); Wayne C. Westerman, Burlingame, CA (US); Christophe Blondin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 218 days.

(21) Appl. No.: 17/209,033

(22) Filed: Mar. 22, 2021

(65) Prior Publication Data

US 2021/0294430 A1    Sep. 23, 2021

Related U.S. Application Data

(60) Provisional application No. 62/993,633, filed on Mar. 23, 2020.

(51) Int. Cl.
*G06F 3/02* (2006.01)
*G06F 3/044* (2006.01)
*G06F 3/01* (2006.01)
*H01H 13/7065* (2006.01)

(52) U.S. Cl.
CPC .............. *G06F 3/021* (2013.01); *G06F 3/017* (2013.01); *G06F 3/0445* (2019.05); *G06F 3/0446* (2019.05); *H01H 13/7065* (2013.01)

(58) Field of Classification Search
CPC ........ G06F 3/021; G06F 3/445; G06F 3/0446; G06F 3/017
USPC ........................................................ 345/174
See application file for complete search history.

(56) References Cited

U.S. PATENT DOCUMENTS

| | | | |
|---|---|---|---|
| 4,771,139 A | 9/1988 | DeSmet |
| 4,857,684 A | 8/1989 | Gratke |
| 4,933,807 A | 6/1990 | Duncan |
| 6,204,839 B1 | 3/2001 | Mato |
| 6,918,612 B2 | 7/2005 | Smith |
| 7,030,860 B1 | 4/2006 | Hsu |
| 7,395,717 B2 | 7/2008 | DeAngelis et al. |
| 7,538,760 B2 | 5/2009 | Hotelling et al. |

(Continued)

FOREIGN PATENT DOCUMENTS

WO    WO 14/006456    1/2014

*Primary Examiner* — Calvin C Ma
(74) *Attorney, Agent, or Firm* — Brownstein Hyatt Farber Schreck, LLP

(57) ABSTRACT

An input device includes a keycap, a first electrode disposed to move in response to movement of the keycap, a planar array of electrodes extending at least partially under the keycap, and a sensor. The planar array of electrodes includes a second electrode, a third electrode, and a fourth electrode extending between the second electrode and the third electrode. The sensor is coupled to at least one of the second electrode or the third electrode and configured to generate a signal indicative of a change in capacitive coupling between the second electrode and the third electrode. The change in the capacitive coupling may result from movement of the first electrode.

28 Claims, 16 Drawing Sheets

(56) References Cited

U.S. PATENT DOCUMENTS

| | | |
|---|---|---|
| 7,589,713 B2 | 9/2009 | Sato |
| 7,679,010 B2 | 3/2010 | Wingett |
| 7,813,774 B2 | 10/2010 | Perez-Noguera |
| 7,829,812 B2 | 11/2010 | Tolbert et al. |
| 7,999,643 B1 | 8/2011 | Dening |
| 8,178,808 B2 | 5/2012 | Strittmatter et al. |
| 8,258,418 B2 | 9/2012 | Chen |
| 8,266,971 B1 | 9/2012 | Jones |
| 8,269,124 B2 | 9/2012 | Jung et al. |
| 8,450,627 B2 | 5/2013 | Mittleman et al. |
| 8,526,161 B2 | 9/2013 | Weber et al. |
| 8,581,870 B2 | 11/2013 | Bokma et al. |
| 8,735,755 B2 * | 5/2014 | Peterson ............... H03K 17/98 200/600 |
| 8,847,092 B2 | 9/2014 | Kudrna et al. |
| 8,927,890 B2 | 1/2015 | Peterson et al. |
| 9,001,080 B2 | 4/2015 | Okayama et al. |
| 9,012,795 B2 | 4/2015 | Niu |
| 9,069,388 B2 | 6/2015 | Karhiniemi et al. |
| 9,279,733 B2 | 3/2016 | Prest et al. |
| 9,459,743 B2 | 10/2016 | Zhan et al. |
| 9,513,321 B2 | 12/2016 | Frangen |
| 9,543,948 B2 | 1/2017 | Curtis et al. |
| 9,632,591 B1 | 4/2017 | Marshall et al. |
| 9,715,317 B2 | 7/2017 | Park |
| 9,733,745 B1 | 8/2017 | Kremin |
| 10,148,268 B2 | 12/2018 | Bolender |
| 10,241,590 B2 | 3/2019 | Marshall et al. |
| 10,282,041 B2 | 5/2019 | Shinkai et al. |
| 10,394,342 B2 * | 8/2019 | Imm .................. G06F 3/011 |
| 10,503,313 B2 | 12/2019 | Datta et al. |
| 2008/0088582 A1 | 4/2008 | Prest et al. |
| 2008/0088597 A1 | 4/2008 | Prest et al. |
| 2008/0088600 A1 | 4/2008 | Prest et al. |
| 2008/0202824 A1 | 8/2008 | Philipp et al. |
| 2008/0297487 A1 | 12/2008 | Hotelling et al. |
| 2009/0046110 A1 | 2/2009 | Sadler et al. |
| 2010/0060568 A1 | 3/2010 | Fisher et al. |
| 2010/0156814 A1 | 6/2010 | Weber et al. |
| 2011/0285662 A1 | 11/2011 | Maenpaa |
| 2012/0032916 A1 | 2/2012 | Enoki |
| 2013/0100030 A1 | 4/2013 | Los et al. |
| 2013/0265062 A1 | 10/2013 | Wang et al. |
| 2014/0090967 A1 | 4/2014 | Inagaki |
| 2014/0252881 A1 | 9/2014 | Dinh et al. |
| 2015/0185909 A1 | 7/2015 | Gecnuk |
| 2018/0074694 A1 | 3/2018 | Lehmann et al. |
| 2021/0320659 A1 * | 10/2021 | Hsu .................. H03K 17/98 |

* cited by examiner

KEYBOARD WITH CAPACITIVE KEY POSITION, KEY MOVEMENT, OR GESTURE INPUT SENSORS

CROSS-REFERENCE TO RELATED APPLICATION

This application is a nonprovisional of and claims the benefit under 35 U.S.C. § 119(e) of U.S. Provisional Patent Application No. 62/993,633, filed Mar. 23, 2020, the contents of which are incorporated herein by reference as if fully disclosed herein.

FIELD

The described embodiments generally relate to keyboards and other input devices having one or more keys. More particularly, the described embodiments relate to systems and devices for detecting key positions, key movement, and/or gesture input provided on or over a set of keys (or on or over a bezel adjacent the set of keys).

BACKGROUND

Computers and other electronic devices sometimes receive input from a keyboard. The keyboard may be an integrated keyboard (as is often the case with a laptop computer, tablet computer, kiosk, or computer terminal) or a standalone keyboard (as may be the case with a desktop computer, tablet computer, or smart television). Keyboards may have various arrangements of keys, and in some cases may include alphanumeric keys, alphanumeric plus extended function keys, only numeric keys, or another subset or combination of keys.

SUMMARY

Embodiments of the systems, devices, methods, and apparatus described in the present disclosure are directed to keyboards and other input devices having one or more keys. More particularly, the described embodiments relate to a keyboard or other input device having capacitive key position, key movement, and/or gesture input sensors. The capacitive sensors may be used to detect a key "make" (e.g., a key press or actuation), a key "break" (e.g., a key release), or other parameters related to key position or key movement. In some cases, the capacitive sensors may also or alternatively be used to detect motion (e.g., gesture input) provided on or over the keys, or on or over a bezel that is adjacent to the set of keys. A gesture input may be limited to motion that does not trigger a key make event, or in some cases may include motion that does trigger a key make event.

In a first aspect, the present disclosure describes an input device. The input device may include a keycap, a first electrode disposed to move in response to movement of the keycap, a planar array of electrodes extending at least partially under the keycap, and a sensor. The planar array of electrodes may include a second electrode, a third electrode, and a fourth electrode extending between the second electrode and the third electrode. The sensor may be coupled to at least one of the second electrode or the third electrode and configured to generate a signal indicative of a change in capacitive coupling between the second electrode and the third electrode resulting from movement of the first electrode.

In another aspect, the present disclosure describes another input device. The input device may include a plate, a circuit board, a keycap, and a dielectric keycap retainer including a flipper. The circuit board may be disposed on a first side of the plate, and the keycap may be disposed on a second side of the plate. The dielectric keycap retainer may attach the keycap to the plate. The flipper may have an end that moves away from the circuit board when a force is applied to the keycap, and toward the circuit board when the force is removed from the keycap. An electrically floating electrode may be attached to the end of the flipper.

In still another aspect of the disclosure, the present disclosure describes another input device. The input device may include a plate, a circuit board disposed on a first side of the plate, a keycap disposed on a second side of the plate, a deformable member, and a sensor. A first electrode may be disposed to move in response to movement of the keycap. A second electrode may be attached to the circuit board and positioned at least partially under the keycap. The deformable member may provide a mechanical resistance to depression of the keycap. The sensor may be configured to output a signal indicative of movement of the first electrode with respect to the second electrode.

In another aspect of the disclosure, the present disclosure describes another input device. The input device may include a set of keys having a set of movable keycaps; a first array of electrodes attached to the set of movable keycaps; a second array of electrodes disposed below the set of movable keycaps; a first set of sensors coupled to the second array of electrodes and configured to generate mutual capacitance measurements; and a second set of sensors coupled to the second array of electrodes and configured to generate self-capacitance measurements.

In addition to the aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
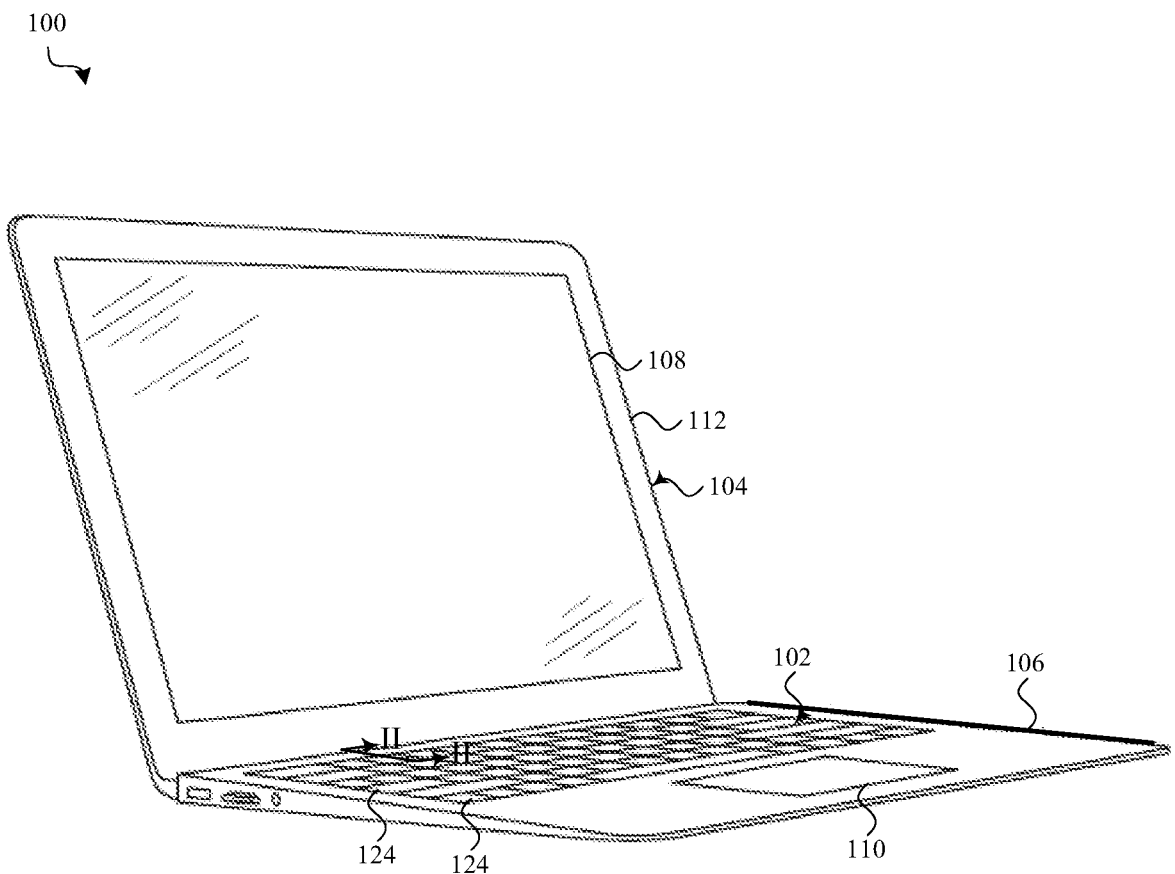
FIG. 1A shows a perspective view of a keyboard integrated into a computing device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments and appended claims.

The described embodiments relate to a keyboard or other input device having capacitive key position and/or movement sensors. The capacitive sensors may be used to detect a key "make" (e.g., a key press), a key "break" (e.g., a key release), or other parameters related to key position or key movement.

The detection of key position and/or movement may be based on the detection of changes in mutual capacitance between one or more electrodes that move with a keycap, and one or more other electrodes that have fixed positions with respect to a circuit board that extends under the keycap. For example, drive and sense electrodes may have fixed positions on a circuit board that extend under a keycap, and a capacitive coupling between the drive and sense electrodes may be caused to change by movement of an electrically floating electrode that is attached to the underside of the keycap (or to a movable component of the keycap's retainer). Placement of an electrical shield electrode between the drive and sense electrodes can help minimize the capacitive coupling between the drive and sense electrodes in one position of the keycap (e.g., in an extended position of the keycap).

The described keyboard or other input devices may additionally or alternatively be used to detect gesture input. Gesture input may be detected primarily in response to self-capacitance measurements, which self-capacitance measurements may be obtained from the same electrodes that are used for mutual capacitance sensing, as well as, or instead of, from other electrodes.

These and other embodiments are described with reference to FIGS. 1A-11. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. The use of alternative terminology, such as "or", is intended to indicate different combinations of the alternative elements. For example, A or B is intended to include, A, or B, or A and B. The use of designators such as "first" and "second" are used solely for the purpose of distinguishing different instances of a particular type of element and have no substantive meaning. As a result, an element of a particular type may be introduced in the description as a first element of the particular type, but referred to in a claim as a second element of the particular type.

Figure 1B:
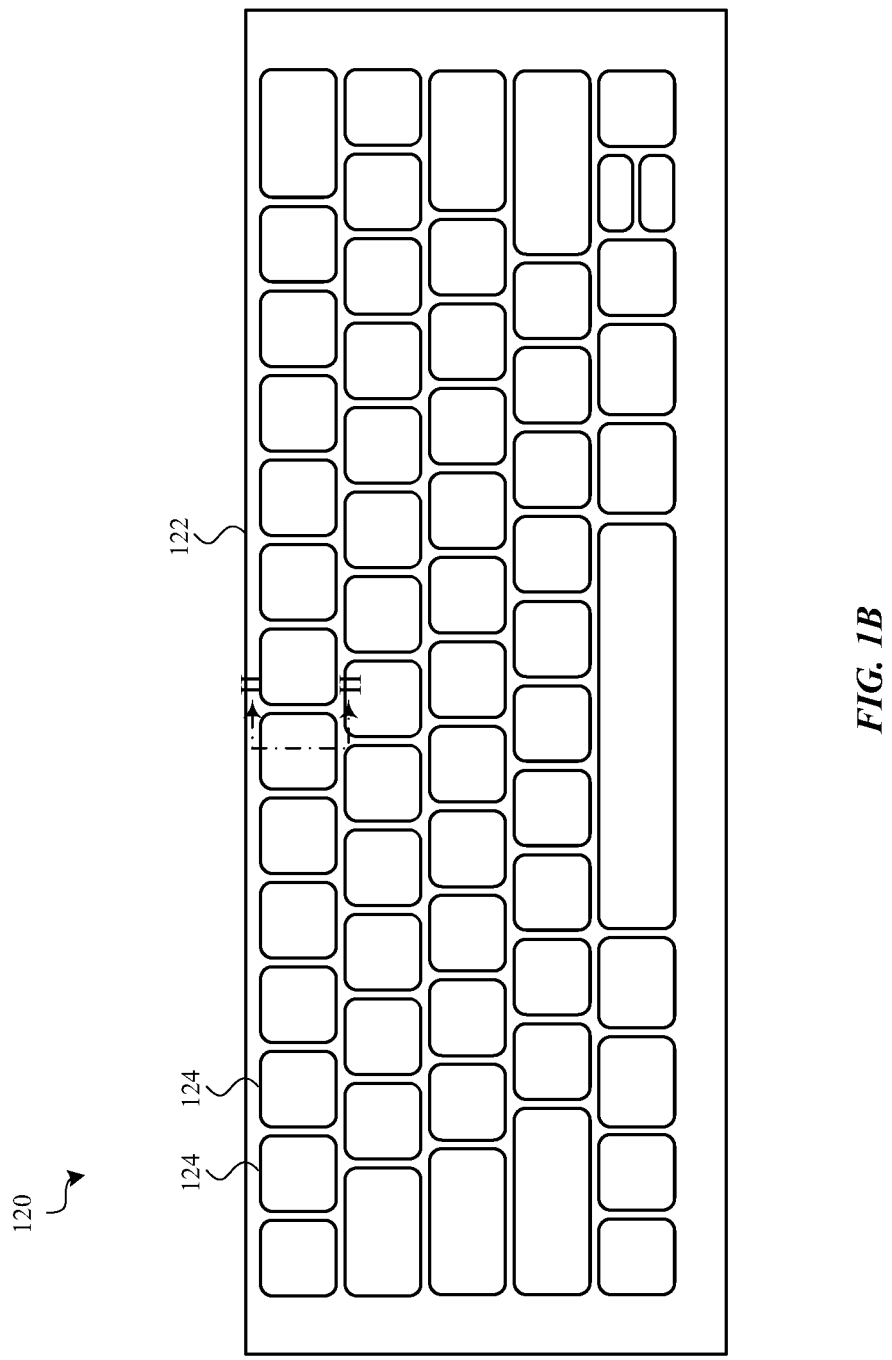
FIG. 1B shows a plan view of a standalone and/or substantially self-contained keyboard.

FIGS. 1A and 1B show example keyboards. FIG. 1A shows a perspective view of a keyboard 102 integrated into a computing device 100. Although the computing device 100 is shown to take the form of a laptop computer, the computing device 100 may take substantially any form, and in other embodiments may take the form of a desktop computer, a smart phone, a portable gaming device, and so on. By way of example, the keyboard 102 is shown mounted within a base 106 of a clamshell-type housing 104. The housing 104 also includes a lid 108, with the lid 108 coupled to the base 106 by one or more hinges (not shown). In addition to the keyboard 102, the base 106 may contain a processor, a memory, electronic storage, a touch input device 110, and so on. The lid 108 may contain an electronic display 112 (e.g., an organic light-emitting display (OLED), liquid crystal display (LCD), or other type of display). By way of example, the lid 108 is shown in an open position in FIG. 1A. Alternatively, the lid 108 may be closed to protect the keyboard 102 and the display 112.

FIG. 1B shows a plan view of a standalone and/or substantially self-contained keyboard 120. The keyboard 120 may include a housing 122 (or enclosure) that is separate from the housing of a computing device that receives input from (or provides output (e.g., haptic output) to) the keyboard 120. In a standalone configuration, the keyboard 120 may include one or more communication interfaces (e.g., a cable interface (e.g., a Universal Serial Bus (USB) interface, a wireless interface, and so on) for transferring data to a separate computing device.

Referring now to both FIG. 1A and FIG. 1B, the base 106 (in FIG. 1A) or housing 122 (in FIG. 1B) may substantially surround a set of keys 124. In some embodiments, the base 106 or housing 122 may define multiple apertures. One or more of the keys 124 may extend through each of the apertures. Alternatively, the base 106 or housing 122 may define a single aperture through which all of the keys 124 extend.

The keyboard 102 or 120 may include multiple keys 124 having the same or varying sizes and/or shapes. Additionally, each of the keys 124 may include a symbol or indicator that is viewable on a top or side surface thereof. For example, the symbol for each key 124 may be painted or etched in the key 124 (not shown), and in some cases may be illuminated by illumination provided through or around the key 124 (e.g., through an optically clear or transparent portion of the key 124, or through an optically clear or transparent portion of the base 106 or housing 122, or through a portion of an aperture not filled by the key 124). In some embodiments, a display may be positioned under each key 124, or under a set of keys 124 (and in some cases, under all of the keys 124). If the keys 124 have transparent key caps, the display may be used to dynamically display a character associated with each key 124, and change the character along with how key input is interpreted. Each of the keys 124 may represent one or more different inputs, and as a key 124 is pressed by a user, the key 124 may provide an input to a computing device. For example, each key 124 may be associated with a sensor that detects when it is pressed or released (e.g., a make/break sensor). Alternatively, each key 124 may be associated with a sensor that detects other states, such as when a user is proximate to the key 124, when a user has contacted the key 124, how far the key 124 has been pressed, and/or an amount of force applied to the key 124. The sensor may transmit a signal to a processor within the computing device 100 or keyboard 102 or 120, which signal may indicate key make/break, user proximity, user contact, amount of force, or so on. In some cases, more than one sensor may be associated with a single key 124 (e.g., different sensors for sensing proximity, contact, make/break, or amount of force). In some cases, a single sensor may be associated with a group of keys 124, and may scan the states of various keys 124 in the group. The sensor(s) associated with a key 124, or with a group of keys 124, may include capacitive, resistive, optical, mechanical, ultrasonic, and/or other types of sensors.

Figure 2A:
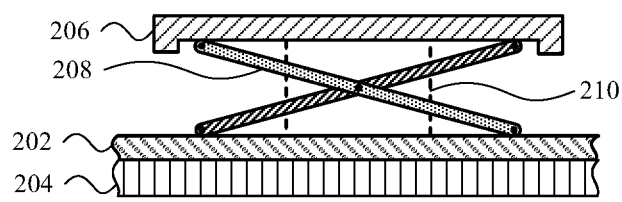
FIG. 2A shows, in elevation, a first example cross-section of part of the keyboard described with reference to FIGS. 1A and 1B.

FIG. 2A shows, in elevation, a first example cross-section 200 of part of the keyboard described with reference to FIGS. 1A and 1B. The cross-section 200 is taken through a key of the keyboard (e.g., along cutline II-II of FIG. 1B). As shown, the keyboard may include a plate 202 (e.g., a feature plate), a circuit board 204 disposed on a first side of the plate 202, and a keycap 206 disposed on a second side of the plate 202. A keycap retainer 208 may removably or permanently attach the keycap 206 to the plate 202. In some embodiments, the plate 202 and/or keycap retainer 208 may be a dielectric (e.g., a dielectric plate and/or a dielectric keycap retainer).

The keycap retainer 208 is shown to include a scissor mechanism in FIG. 2A. Other examples of the keycap retainer are described with reference to other figures. In some embodiments, the keycap retainer may take the form of a butterfly mechanism.

Optionally, the keycap 206 may be mechanically supported, and biased toward an extended position, by a deformable member 210 that provides a mechanical resistance to depression of the keycap 206. Alternatively, the keycap retainer 208 may provide mechanical resistance to depression of the keycap 206. In some embodiments, the deformable member 210 may include a collapsible dome.

Figure 2B:
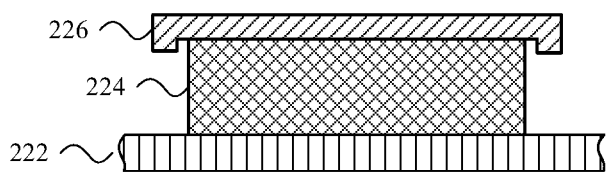
FIG. 2B shows, in elevation, a second example cross-section of part of the keyboard described with reference to FIGS. 1A and 1B.

FIG. 2B shows, in elevation, a second example cross-section 220 of part of the keyboard described with reference to FIGS. 1A and 1B. The cross-section 220 is taken through a key of the keyboard (e.g., along cutline II-II of FIG. 1B). As shown, the keyboard may include a circuit board 222 to which a key module 224 is directly coupled (e.g., soldered to one or more contacts of the circuit board 222 and/or adhesively bonded to the circuit board 222). The key module 224 may include a keycap retainer and/or deformable member that operate similarly to (or different from) the keycap retainer and deformable member described with reference to FIG. 2A. A keycap 226 may be removably or permanently attached to the keycap retainer within the key module 224.

Figure 3:
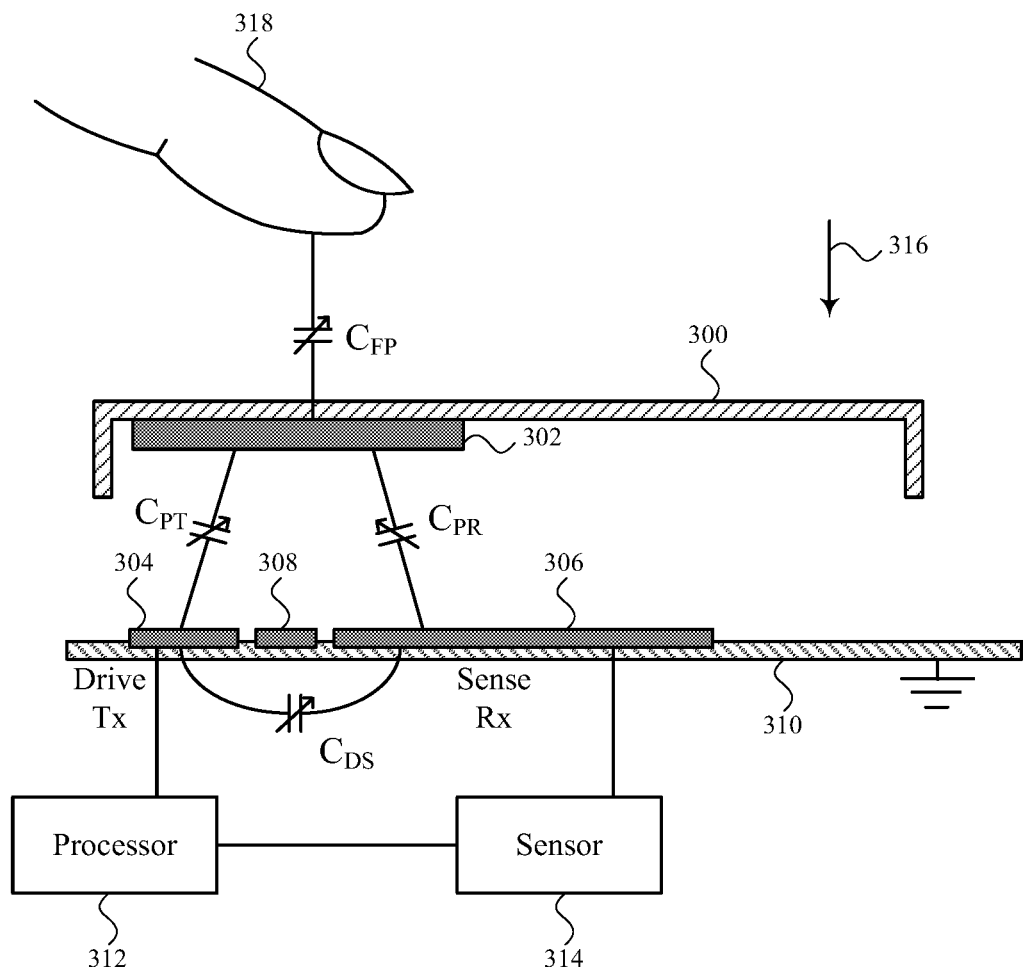
FIG. 3 shows an arrangement of electrodes for detecting a key press or release.

FIG. 3 shows an arrangement of electrodes for detecting a key press or release (or equivalently, detecting a key make or key break). The arrangement of electrodes may be used in conjunction with any of the keys described with reference to FIGS. 1A-2B, with other types of keys, or with other types of capacitive input devices (e.g., a capacitive input device having an input surface that does not move when pressed). The arrangement includes a first electrode 302 (or conductor) disposed to move in response to movement of a keycap 300, and second, third, and fourth electrodes 304, 306, 308 (or conductors) that extend (or are positioned) at least partially under (or below) the keycap 300. The fourth electrode 308 may extend between the second and third electrodes 304, 306, and may be configured to provide electrical shielding between the second and third electrodes 304, 306. In some cases, and as shown, the second, third, and fourth electrodes 304, 306, 308 may be arranged in a planar array of electrodes, such as a planar array of electrodes formed on a circuit board 310.

In some embodiments, the first electrode 302 may be an electrically floating electrode, the second electrode 304 may be a drive (Tx) electrode, the third electrode 306 may be a sense (Rx) electrode, and the fourth electrode 308 may be an electrical shield electrode. A processor 312 may be configured to modulate a drive signal applied to the drive electrode 304, or to control another component that modulates a drive signal applied to the drive electrode 304. The processor 312 or other component may also be configured to determine when or how long the drive signal is applied to the drive electrode 304. A sensor 314 coupled to the sense electrode 306 may be configured to generate a signal indicative of movement of the electrically floating electrode 302 with respect to the drive and/or sense electrodes 304, 306, or a signal indicative of a change in capacitive coupling between the drive and sense electrodes 304, 306. The change in capacitive coupling may result from movement of the electrically floating electrode 302. In some embodiments, the functions of the sensor 314 may be provided by the processor 312, or the functions of the processor 312 and the sensor 314 may be otherwise combined in, or allocated to, one or more components.

When the keycap 300 (and also the electrically floating electrode 302) are biased toward an extended position, as shown in FIG. 3, there may be little or no capacitive coupling between the drive and sense electrodes 304, 306, and the drive signal may not be detectable by the sensor 314 (or may not exceed a detection threshold). The electrical shield electrode 308 may be biased, to ground or otherwise, to provide electrical shielding between the drive and sense electrodes 304, 306, and to minimize the capacitive coupling between the drive and sense electrodes 304, 306 when the keycap 300 is in the extended position. When the keycap 300 is pressed toward the circuit board 310 (i.e., in direction 316), the capacitive coupling between the drive and sense electrodes 304, 306 may increase as a result of the electrically floating electrode 302 moving closer to the drive and sense electrodes 304, 306, and any electrical shielding provided by the electrical shield electrode 308 may be overcome (or overcome to a greater extent than when the keycap 300 is in the extended position). The signal generated by the sensor 314 may be based on a first capacitance ($C_{DS}$) between the drive and sense electrodes 304, 306, a second capacitance ($C_{PT}$) between the drive and electrically floating electrodes 304, 302, a third capacitance ($C_{PR}$) between the sense and electrically floating electrodes 306, 302, and a fourth capacitance ($C_{FP}$) between a user's finger 318 and the electrically floating electrode 302. For example, the signal generated by the sensor 314 may correspond to a sensed capacitance ($C_{Sense}$), based on the first through fourth capacitances defined above, as follows:

$$C_{Sense} \approx C_{DS} + \frac{C_{PT}C_{PR}}{C_{PT} + C_{PR} + C_{FP}}$$

In some embodiments, a plate may extend between the keycap 300 and the circuit board 310, as shown in FIG. 2A, and a keycap retainer (not shown in FIG. 3) may attach the keycap 300 to the plate. In other embodiments, a key module having a keycap retainer, to which the keycap 300 is attached, may be mounted on the circuit board 310. In these latter embodiments, a plate (or feature plate) may not be used.

In addition to using the signal generated by the sensor 314 to detect a key press (make) or release (break), the signal may be used to determine when a user is proximate to the keycap 300, when a user has contacted the keycap 300, how far the keycap 300 has moved (or equivalently, the extent to which the keycap 300 has been pressed or released), and/or an amount of force applied to the keycap 300. The distance that the keycap 300 has been moved (or height of the keycap 300) may be determined because the capacitive coupling between the drive and sense electrodes 304, 306 is related to the height of the keycap 300. The range of determinations that may be made from the sensor's signal may depend, in part, on the sizes and positions of the electrodes 302-308, the materials used to form the keycap 300, a keycap retainer, and/or other components, and/or the sensitivity of the electrodes 302-308 and/or sensor 314.

Figure 4A:
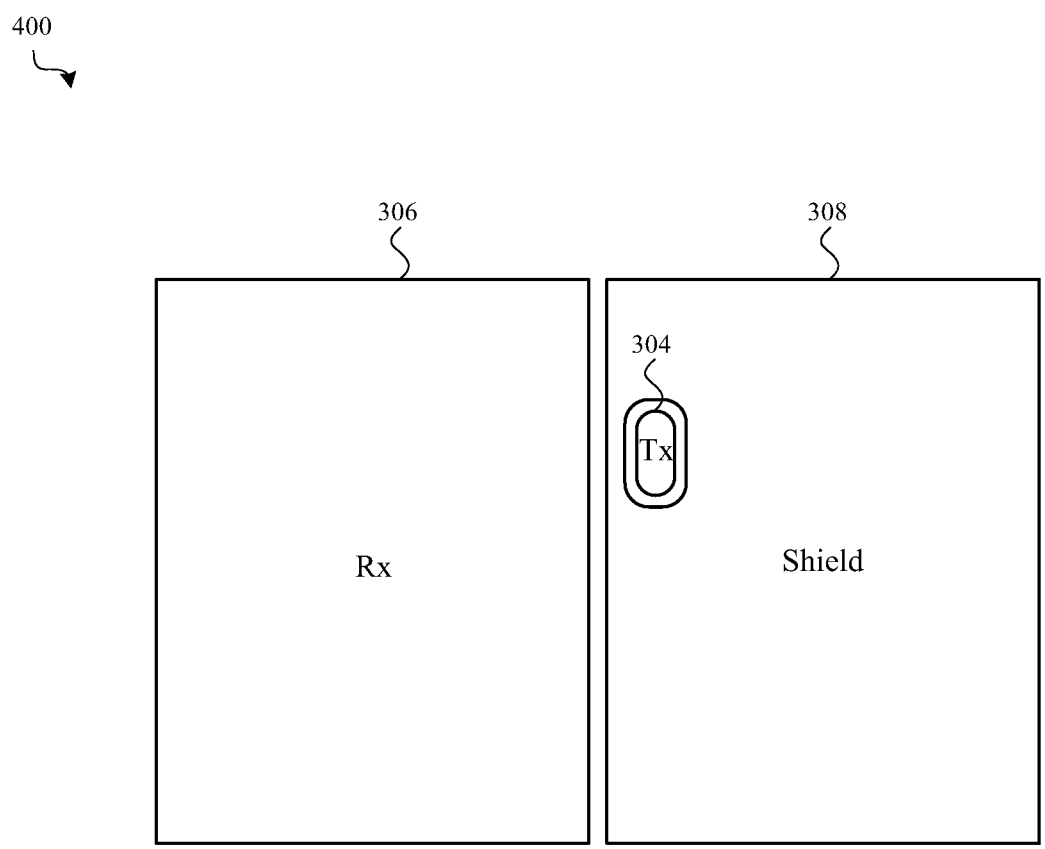
FIG. 4A shows a first example plan view of the drive, sense, and electrical shield electrodes described with reference to FIG. 3.

FIG. 4A shows a first example plan view 400 of the drive, sense, and electrical shield electrodes 304-308 described with reference to FIG. 3. As shown, the electrical shield electrode 308 may surround the drive electrode 304. This may provide better electrical isolation between the drive and sense electrodes 304, 306 when a keycap positioned above the electrodes 304-308 is in an extended position. In an alternative electrode arrangement, the positions of the drive and sense electrodes 304, 306 may be swapped.

The elongate shape of the drive electrode 304 can help compensate for misalignment of an electrically floating electrode in the direction of the elongation.

Figure 4B:
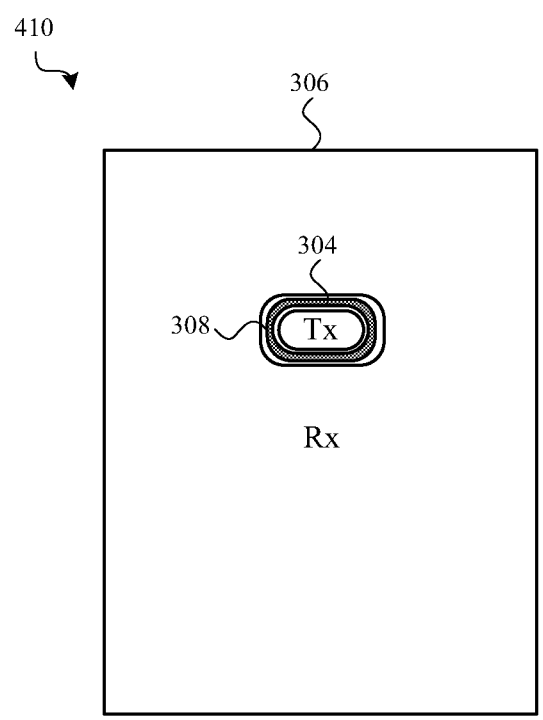
FIG. 4B shows a first example plan view of the drive, sense, and electrical shield electrodes described with reference to FIG. 3.

FIG. 4B shows a second example plan view 410 of the drive, sense, and electrical shield electrodes 304-308 described with reference to FIG. 3. As shown, the electrical shield electrode 308 may surround the drive electrode 304, and the sense electrode 306 may surround the electrical shield electrode 308.

Figure 5A:
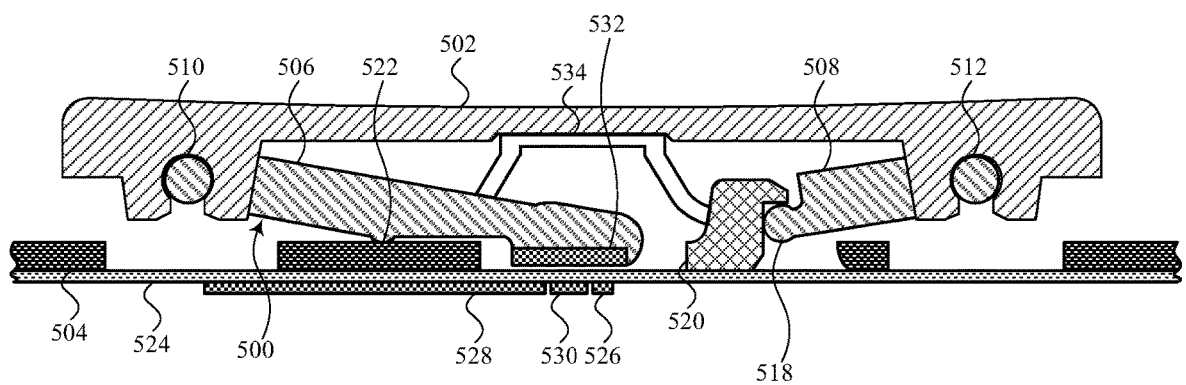
FIGS. 5A-5F show example features of a keycap retainer for retaining a keycap to a plate (or a keycap to a key module housing)
Figure 5B:
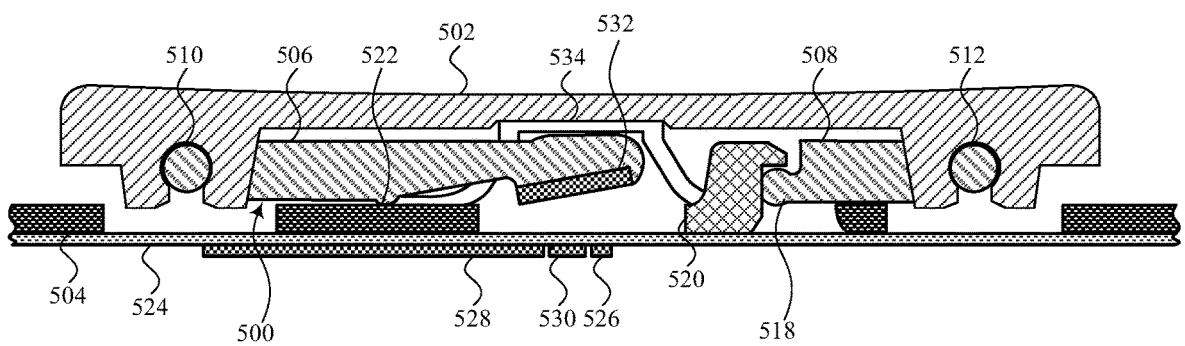
Figure 5C:
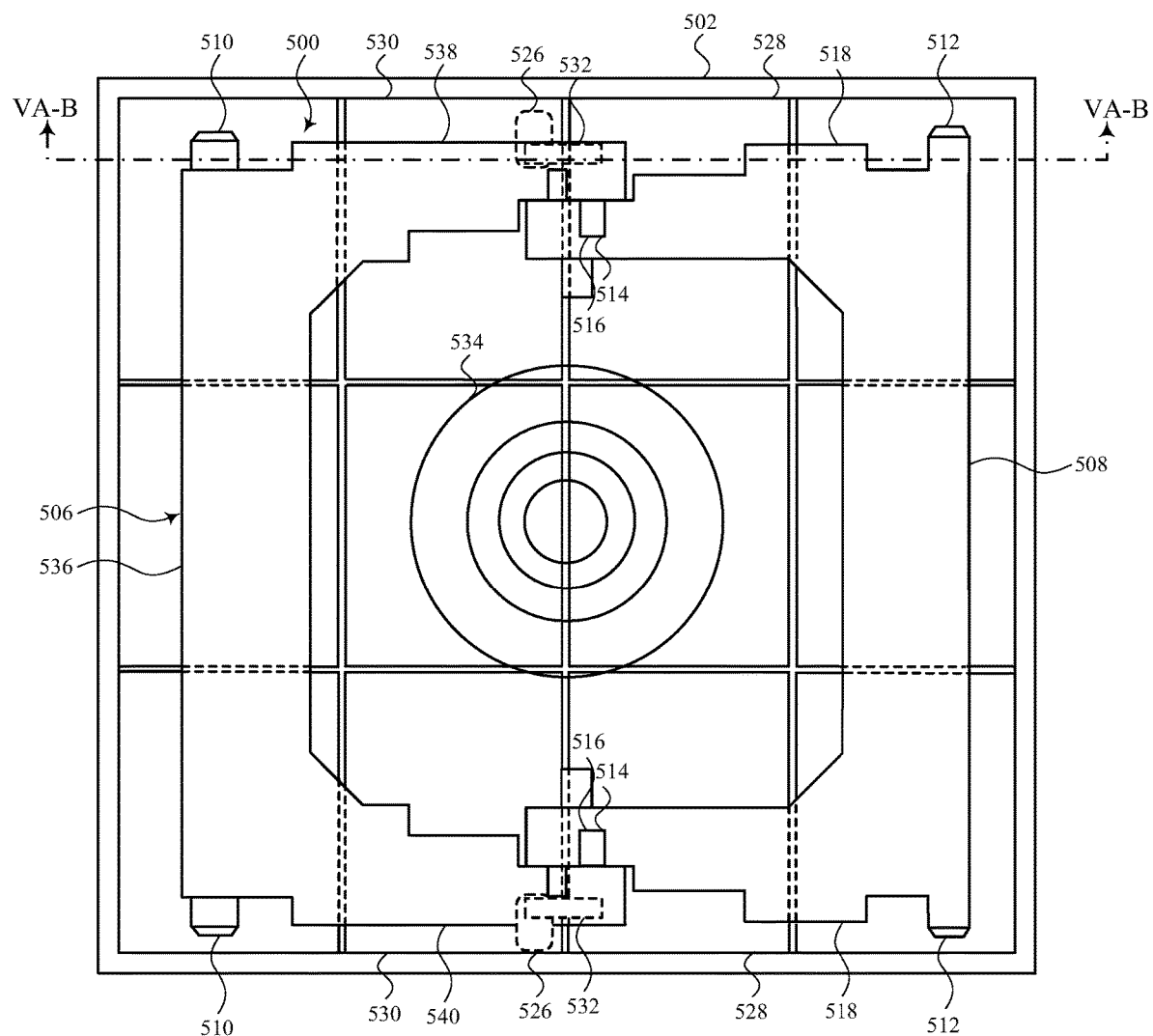

FIGS. 5A-5F show example features of a keycap retainer 500 for retaining a keycap 502 to a plate 504 (or a keycap to a key module housing). FIGS. 5A-5B show a first elevation of the keycap retainer 500 (taken, for example, along cutline VA-B of FIG. 5C or 5F), with FIG. 5A showing the keycap 502 biased toward an extended position by the keycap retainer 500, and FIG. 5B showing the keycap 502 moved to a pressed position (e.g., in response to a force applied to the keycap 502). FIG. 5C shows a first example plan view of the keycap retainer 500.

The keycap retainer 500 includes a first movable truss member 506 and a second movable truss member 508, each of which may have a first end including one or more pivot pins 510, 512. Each of the pivot pins 510, 512 may be received (e.g., snapped) into a respective socket that is formed in, or attached to, the underside of the keycap 502. Alternatively, one or more of the pivot pins 510, 512 may be formed in or otherwise attached to the underside of the keycap 502, and the sockets may be provided at the first ends of the first and second movable truss members 506, 508. In some cases, the sockets may be generally C-shaped sockets and/or compression sockets. In alternative embodiments, the pins 510, 512 and sockets may be replaced by other attachment mechanisms.

The first movable truss member 506 may have a second end (generally opposite the first end of the first movable truss member 506) that includes one or more pivot pins 514 (see, FIG. 5C). Each of the pivot pins 514 may be received by, and pivot within, a respective sleeve 516 that is formed in a second end of the second movable truss member 508 (with the second end of the second movable truss member 508 being generally opposite the first end of the second movable truss member 508).

The first movable truss member 506 may have a rib, nub, bend, and/or other feature 522 between its first and second ends. The feature 522 may rest on the plate 504 and cause the first movable truss member 506 to operate as a flipper, with the second end of the first movable truss member 506 moving away from (or flipping away from) the plate 504 (and away from a circuit board 524 carrying an array of electrodes) when a force is applied to the keycap 502 and the keycap 502 moves toward the plate 504. Conversely, the second end of the first movable truss member 506 may move toward the plate 504 and circuit board 524 when the force is removed from the keycap 502 and the keycap 502 moves away from the plate 504.

The second movable truss member 508 may further include one or more pivot pins, nubs, or protrusions 518 disposed between its first and second ends. Each of the protrusions 518 may be received by, and rotate, slide, or move within, a set of one or more tracks or catches 520 that is formed in, or attached to, the plate 504.

In some embodiments, the keycap retainer 500 may be a dielectric keycap retainer, with the first and second movable truss members 506, 508 being formed from a dielectric material. In some embodiments, the plate 504 may be a dielectric plate, and may be formed from a dielectric material. The keycap retainer 500 and plate 504 may be formed from the same or different dielectric materials. For example, in some cases, both the keycap retainer 500 and plate 504 may be formed from plastic, or from different plastics. In some cases, the keycap retainer 500 may be formed from nylon.

A circuit board 524 may be disposed on (e.g., abutted or attached to) a first side of the plate 504, opposite a second side of the plate 504 on which the keycap 502 is disposed. When the circuit board 524 is attached to the plate 504, the circuit board 524 may be attached to the plate 504 by screws, bolts, clips, adhesive, and/or other types of fasteners. The circuit board 524 may include an array of electrodes, including drive and sense electrodes 526, 528 that extend at least partially under the keycap 502. Optionally, the circuit board 524 may include an electrical shield electrode 530 that extends between the drive and sense electrodes 526, 528 (and optionally surrounds one or both of the drive and/or sense electrodes 526, 528).

One or more electrically floating electrodes 532 may be attached to the second end of the first movable truss member 506 (or flipper), such that the electrically floating electrode(s) 532 flip away from the circuit board 524 when the keycap 502 is pressed toward the circuit board 524. In embodiments in which the one or more electrically floating electrodes 532 include two or more electrodes, the electrodes may in some cases be aligned (see, FIG. 5C). A drive and sense electrode 526, 528 may extend at least partially under, or near, each electrically floating electrode 532. In some embodiments, a different set of drive, sense, and electrical shield electrodes 526, 528, 530 may extend under each electrically floating electrode 532. In other embodiments, a shared drive, sense, and/or electrical shield electrode 526, 528, 530 may extend under two or more of the electrically floating electrodes 532 associated with a single keycap 502. In some embodiments, the drive, sense, and electrical shield electrodes 526, 528, 530 shown in FIGS. 5A-5B may be arranged similarly to the electrodes shown in FIG. 3, 4A, or 4B.

In combination, the electrically floating electrode 532, drive electrode 526, sense electrode 528, and optional electrical shield electrode 530 may be used to detect a make, break, or other movement of the keycap 502, similarly to the electrodes described with reference to FIGS. 3-4B. However, in contrast to the electrically floating electrode described with reference to FIG. 3, the electrically floating electrode(s) 532 described with reference to FIGS. 5A-5C move(s) in the opposite direction. A sensor coupled to the sense electrode 528 may nonetheless generate a signal indicative of a change in capacitive coupling between the drive and sense electrodes 526, 528 resulting from movement of the electrically floating electrode 532, which signal may in turn be evaluated by a processor or other circuit to determine a make, break, or other movement of the keycap 502.

As shown primarily in FIG. 5A, the plate 504 may have a hole which allows the flipper to position the electrically floating electrode(s) 532, and in some cases a portion of the second end of the first movable truss member 506, within the hole. This enables positioning the electrically floating electrode 532 very close to the drive and sense electrodes 526, 528 when the keycap 502 is biased toward its extended position. In alternative embodiments, the electrically floating electrode 532 need not be positioned in the hole and/or the hole may not exist. In some embodiments, the plate 504 may be thinner than shown (or thinner in the area of the hole) to enable a positioning of the electrically floating electrode 532 closer to the drive and sense electrodes 526, 528 when the keycap 502 is biased toward its extended position.

Also shown in FIGS. 5A-5C is a deformable member 534 that provides mechanical resistance to depression of the keycap 502. By way of example, the deformable member 534 is shown to be a collapsible dome. The deformable member 534 may be formed from rubber, a flexible plastic, or another type of material. By providing mechanical resistance to the keycap 502, and biasing the keycap 502 toward its extended position, the deformable member 534 may provide these functions apart from the keycap retainer 500, and may simplify the construction and/or operation of the keycap retainer 500. By sensing the keycap's position and movement using electrodes that are not associated with the deformable member 534 (e.g., as a dome switch integrated with the deformable member 534), the mechanism that determines key make/break can be designed (and can function) orthogonal to the mechanism that determines a key's mechanical feel.

FIG. 5C shows an example plan view of the first and second movable truss members 506, 508 described with reference to FIGS. 5A-5B, in relation to two pairs of drive, sense, and electrical shield electrodes 526, 528, 530 that extend at least partially under the keycap 502. As shown, the first truss member 506 may have a central body 536 from which first and second arms 538, 540 extend. In some embodiments, first and second electrically floating electrodes 532 may be respectively attached to the ends of the first and second arms 538, 540. The first and second electrically floating electrodes 532 are spaced apart from each other by at least a distance between the arms.

By way of example, FIG. 5C shows a different set of drive, sense, and electrical shield electrodes 526, 528, 530 extending under each of the first and second electrically floating electrodes 532. For example, a first set of drive, sense, and electrical shield electrodes may extend under the first electrically floating electrode, and a second set of drive, sense, and electrical shield electrodes may extend under the second electrically floating electrode. In alternative embodiments, a shared drive, sense, and/or electrical shield electrode may extend under both of the electrically floating electrodes 532.

Figure 5D:
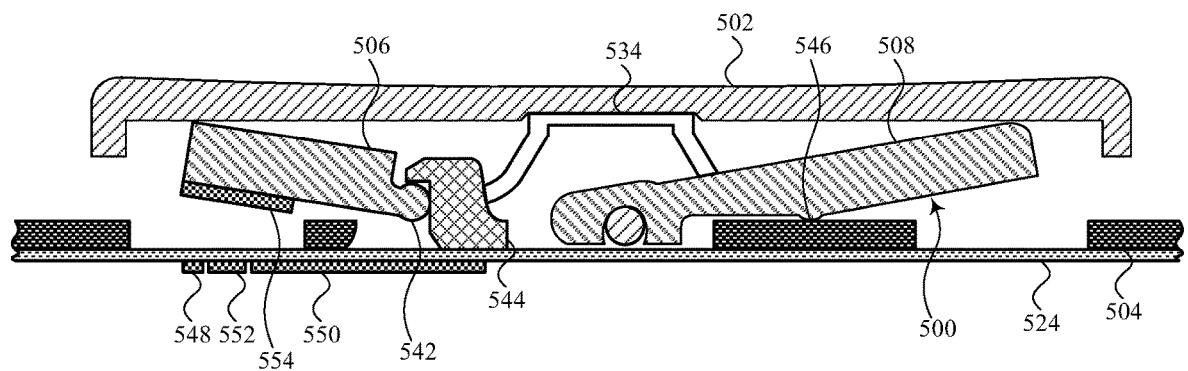
Figure 5E:
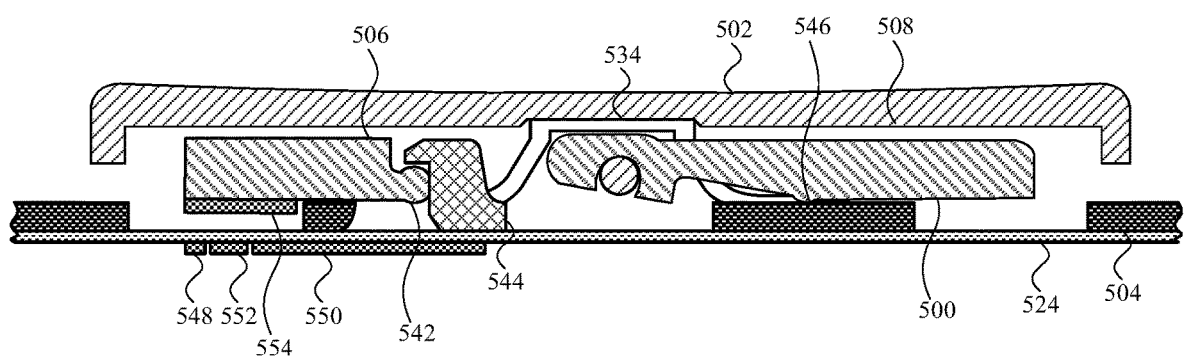
Figure 5F:
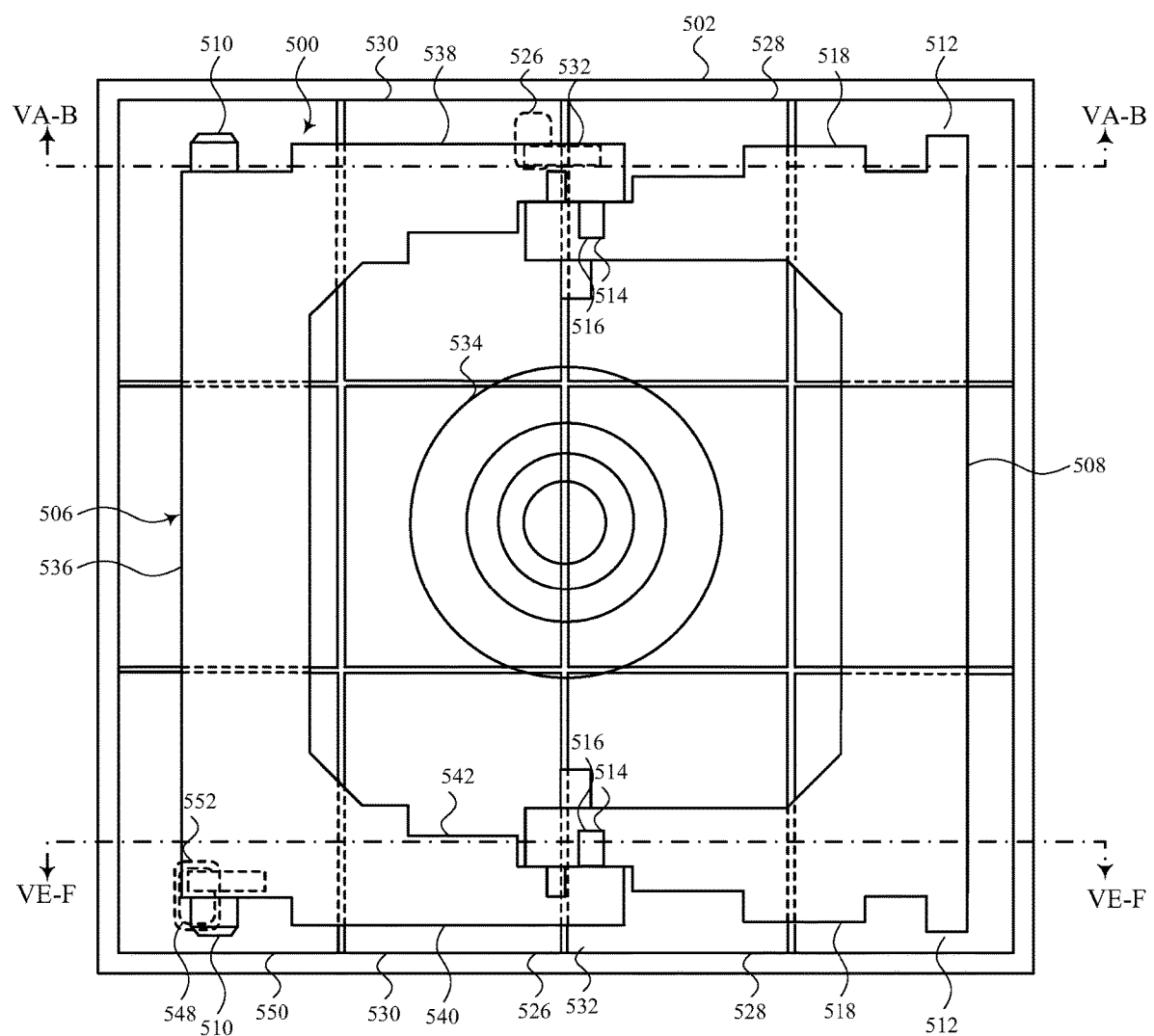

FIGS. 5D-5F show an additional or alternative key make/break sensor that can be incorporated into the keycap 502 described with reference to FIGS. 5A-5C. More particularly, FIGS. 5D-5E show a second elevation of the keycap retainer 500 (taken, for example, along cutline VD-E of FIG. 5F). FIG. 5D shows the keycap 502 biased toward an extended position by the keycap retainer 500, and FIG. 5E shows the keycap 502 moved to a pressed position (e.g., in response to a force applied to the keycap 502). FIG. 5F shows a second example plan view of the keycap retainer 500.

As shown in FIGS. 5D-5E, the first movable truss member 506 may include one or more pivot pins, nubs, or protrusions 542 disposed between its first and second ends. Each of the protrusions 542 may be received by, and rotate, slide, or move within, a set of one or more tracks or catches 544 that is formed in, or attached to, the plate 504.

The second movable truss member 508 may have a rib, nub, bend, and/or other feature 546 between its first and second ends. The feature 546 may rest on the plate 504 and cause opposite ends of the second movable truss member 508 to alternately move toward or away from the plate 504 (and toward or away from the circuit board 524) as a force is applied to, or removed from, the keycap 502.

The circuit board 524 may include additional drive and sense electrodes 548, 550, with the additional drive and sense electrodes 548, 550 extending at least partially under the keycap 502. Optionally, the circuit board 524 may include an additional electrical shield electrode 552 that extends between the drive and sense electrodes 548, 550 (and optionally surrounds one or both of the drive and/or sense electrodes 548, 550).

One or more electrically floating electrodes 554 may be attached to the first end of the first movable truss member 506 (i.e., the end attached to the keycap 502), such that the electrically floating electrode(s) 554 move toward the circuit board 524 when the keycap 502 is pressed toward the circuit board 524, and flip away from the circuit board 524 when force is removed from the keycap 502. The drive and sense electrodes 548, 550 may extend at least partially under, or near, each electrically floating electrode 554. In some embodiments, the drive, sense, and electrical shield electrodes 548, 550, 552 shown in FIGS. 5E-5F may be arranged similarly to the electrodes shown in FIG. 3, 4A, or 4B.

In combination, the electrically floating electrode 554, drive electrode 548, sense electrode 550, and optional electrical shield electrode 552 may be used to detect a make, break, or other movement of the keycap 502, similarly to the electrodes described with reference to FIGS. 3-4B. A sensor coupled to the sense electrode 550 may generate a signal indicative of a change in capacitive coupling between the drive and sense electrodes 548, 550 resulting from movement of the electrically floating electrode 554, which signal may in turn be evaluated by a processor or other circuit to determine a make, break, or other movement of the keycap 502.

In some embodiments, the electrodes 548-554 described with reference to FIGS. 5D-5E may be used in combination with the electrodes 526-532 described with reference to FIGS. 5A-5B to provide a differential key make/break sensor, as shown in FIG. 5F. As a user presses on the keycap 502 shown in FIG. 5F, the electrically floating electrode 532 moves away the sense electrode 528, and the electrically floating electrode 554 moves toward the sense electrode 550. In such cases, the signals received by a sensor coupled to both of the sense electrodes 528 and 550 may receive, from the sense electrodes 528 and 550, signals that are more or less complementary. The complementary signals can provide more robust make/break detection and better keycap distance/height resolution over the full range of keycap motion. For example, the capacitance of the sense electrode 528 may decrease exponentially as the keycap 502 is pressed toward the plate 504, and the capacitance of the sense electrode 550 may increase exponentially as the keycap 502 is pressed toward the plate 504, providing a significant change in capacitance as the height of the keycap 502 traverses both a "make" threshold and a "break" threshold.

As shown primarily in FIG. 5A, the plate 504 may have a hole which allows the first movable truss member 506 (or flipper) to position the electrically floating electrode 554, and in some cases a portion of the first end of the first movable truss member 506, within the hole when the keycap 502 is pressed. This enables positioning the electrically floating electrode 554 very close to the drive and sense electrodes 548, 550 when the keycap 502 is pressed. In alternative embodiments, the electrically floating electrode 554 need not be positioned in the hole and/or the hole may not exist. In some embodiments, the plate 504 may be thinner than shown (or thinner in the area of the hole) to enable a positioning of the electrically floating electrode 554 closer to the drive and sense electrodes 548, 550 when the keycap 502 is pressed.

Figure 6:
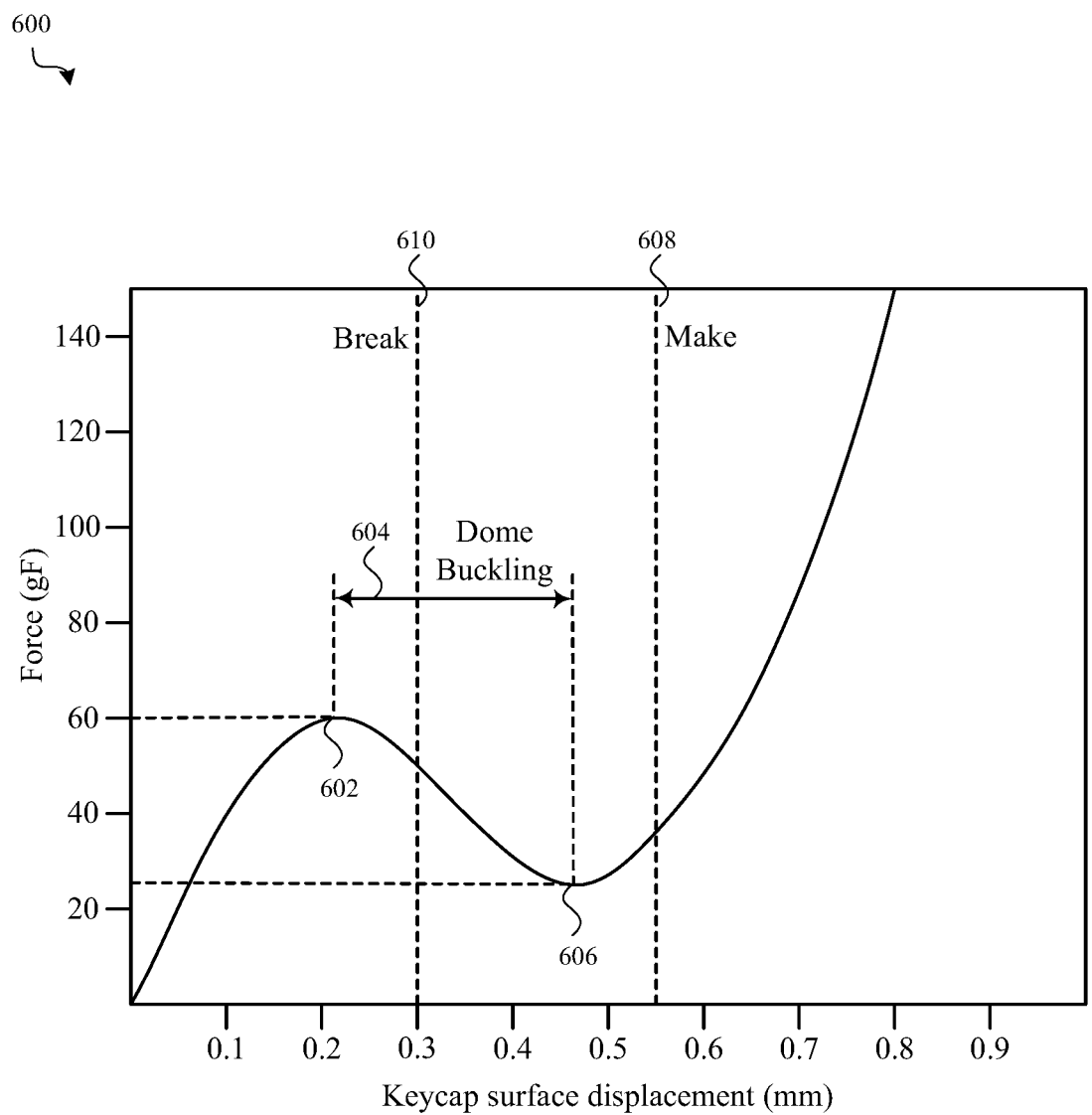
FIG. 6 shows a graph of example make/break thresholds for a collapsible dome made of rubber, which collapsible dome may be used as the deformable member described with reference to FIGS. 5A-5F.

FIG. 6 shows a graph 600 of example make/break thresholds for a collapsible dome made of rubber, which collapsible dome may be used as the deformable member described with reference to FIGS. 5A-5F. Keycap surface displacement (in millimeters (mm)) is shown on the x-axis, and force applied to the keycap (in gram-Force (gF) units) is shown on the y-axis.

At or about a first combination of keycap surface displacement and applied force 602, the collapsible dome begins to buckle (or restore to its non-buckled state). After buckling, and for a range 604 of displacements of the keycap, there is a lessening of the force required to displace the keycap further. At or about a second combination of keycap surface displacement and applied force 606, the collapsible dome fully collapses, and further displacement of the keycap requires a greater applied force. In some cases, a key "make" (or key selection) threshold 608 may be defined at or about a third keycap surface displacement, at a keycap surface displacement greater than the second keycap surface displacement. To provide some hysteresis and avoid errant toggles between key "make" and key "break," a key "break" (or key release) threshold 610 may be defined between the first keycap displacement and the second keycap displacement.

Figure 7:
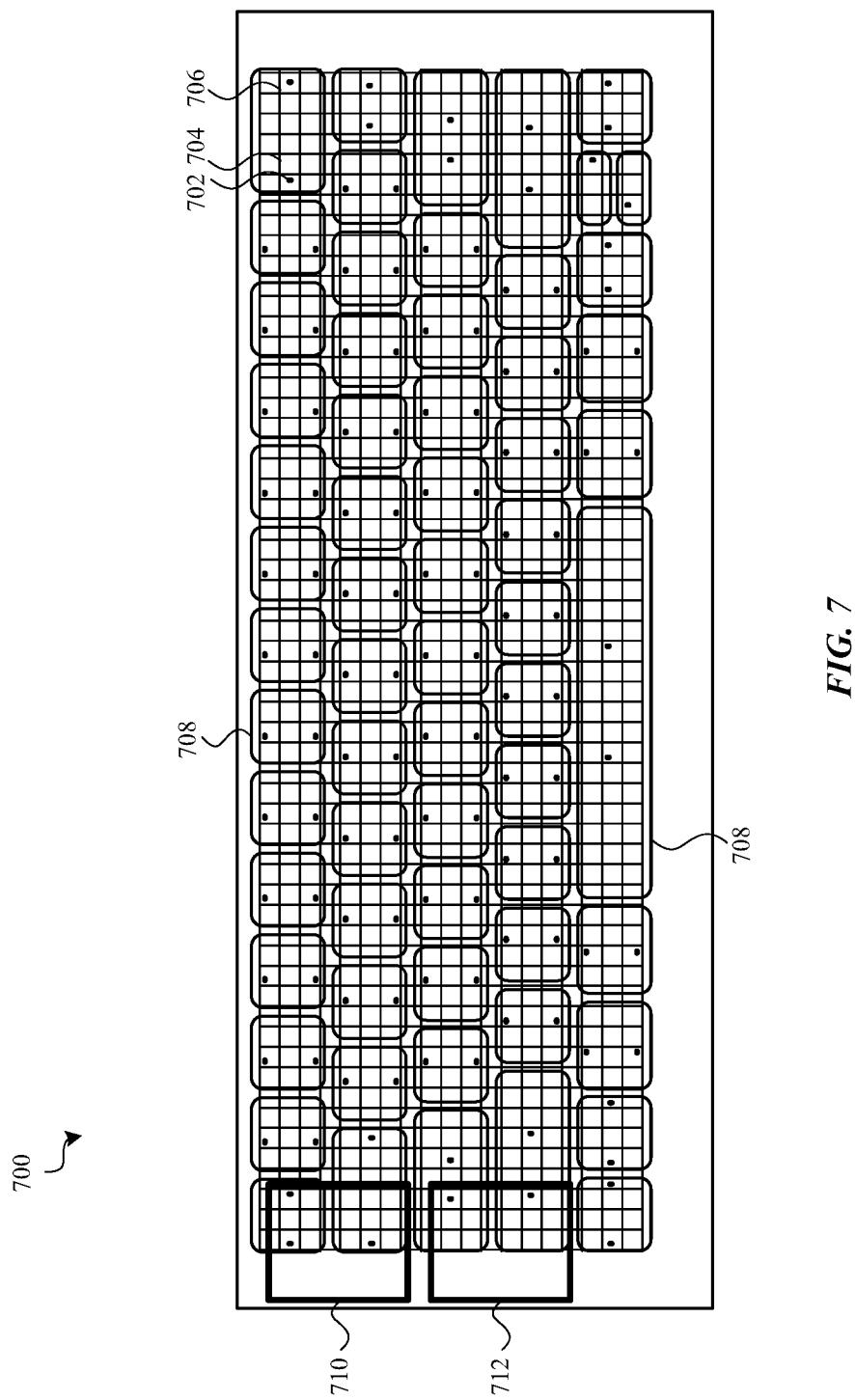
FIG. 7 shows an example plan view of a keyboard, such as the keyboard described with reference to FIG. 1A or 1B, and shows an example placement of drive, sense, and electrical shield electrodes under the keycaps of the keyboard.

FIG. 7 shows an example plan view of a keyboard 700, such as the keyboard described with reference to FIG. 1A or 1B, and shows an example placement of drive, sense, and electrical shield electrodes 702, 704, 706 under the keycaps 708 of the keyboard 700. By way of example, two sets of drive, sense, and electrical shield electrodes 702, 704, 706 extend under each keycap 708. In alternative embodiments, one set, or more than two sets, of drive, sense, and electrical shield electrodes may extend under each keycap 708. An electrically floating electrode may be attached to, and move with, each keycap 708. In some cases, the electrically floating electrodes may be attached to a component of a keycap retainer, as described with reference to FIGS. 5A-5F.

By way of example, the multiple sets of electrodes under some keycaps 708 are aligned top-to-bottom with respect to the keyboard 700, and the multiple sets of electrodes under other keycaps 708 are aligned side-to-side with respect to the keyboard 700. In other embodiments, the sets of electrodes under a keycap 708 may or may not be aligned.

By way of further example, the array of electrodes 702, 704, 706 disposed under the keycaps 708 includes more than the electrodes needed to detect key positions or movements. In some cases, the extra electrodes may be biased (e.g., to ground) to provide additional electrical shielding between drive and sense electrodes, or to provide electrical shielding between different sets of drive and sense electrodes, or to provide electrical shielding between the electrodes disposed under different keycaps 708. In alternative embodiments of the keyboard 700, the extra electrodes may not be provided, or may be used to perform other functions.

In some embodiments, a sensor or processor may simultaneously monitor the sense electrodes 704 to determine the positions or movement of all keycaps 708. In some embodiments, a sensor or processor may perform a sequential scan of the sense electrodes 704 associated with all or a subset of the keycaps 708, and may sequentially determine the positions or movement of all or a subset of the keycaps 708.

In some embodiments, a processor may be configured to use the electrodes associated with a particular keycap (e.g., the drive, sense, electrically floating, and/or electrical shield electrode(s) in a first mode during a first set of time periods, and in a second mode during a second set of time periods. In the first mode, the second electrode may be driven with a modulated drive signal while a sensor coupled to the sense electrode generates a signal indicative of capacitive coupling between the drive and sense electrodes (e.g., capacitive coupling resulting from movement of the electrically floating electrode). In the second mode, the processor may ground the drive and/or sense electrode; read a signal from the sense electrode in the absence of driving the drive electrode; or use the drive, sense, electrically floating, and/or electrical shield electrodes in other ways.

In some embodiments, the keyboard 700 described with reference to FIG. 7, or a keyboard including an array of the keycaps and associated electrodes described with reference to FIGS. 3-5F, may be used to detect one or more gesture inputs of a user. A detectable gesture input may in some cases include a gesture in which the user touches one or more of the keycaps without depressing them (or without depressing them sufficiently to trigger a key make) while providing the gesture input; or a gesture input in which the user moves a part of their body (e.g., their fingers or hands) over but not touching the keycaps while providing the gesture input; or a gesture input in which the user sometimes touches one or more keycaps and sometimes does not touch the keycaps. A gesture input may also include one or more key presses—and even one or more key presses that trigger a kay make or break detection—but this may require disabling the interpretation of key makes and breaks as conventional alphanumeric or character key input.

A gesture input may be recognized from the relationships of capacitances of different electrodes and/or the changing capacitance of one or more particular electrodes. For example, as a user moves one or more fingers over the keyboard, the capacitances (e.g., self-capacitances) of different electrodes may temporarily change in a predetermined pattern. The self-capacitances may be measured by different sensors associated with different electrodes. A swipe, pinch, squeeze, or other gesture input may be detected in this manner. As another example, the capacitance of one or a few electrodes may change as a user rolls their finger on a keycap or moves their finger toward a keycap. A finger roll on a keycap may enable fine positioning of a cursor, for example, and a finger movement toward a keycap that is associated with particular speed or acceleration (as identified by a change or rate of change in capacitance) may be determined as a tap or press gesture input. As yet another example, the movement of one or more fingers toward a particular subset of keycaps, or the resting of one or more fingers on a particular one or more keycaps that are not depressed (e.g., the resting of one or more fingers on a subset of keycaps on which a typist would not normally rest their fingers), may be recognized as a gesture input.

Figure 8:
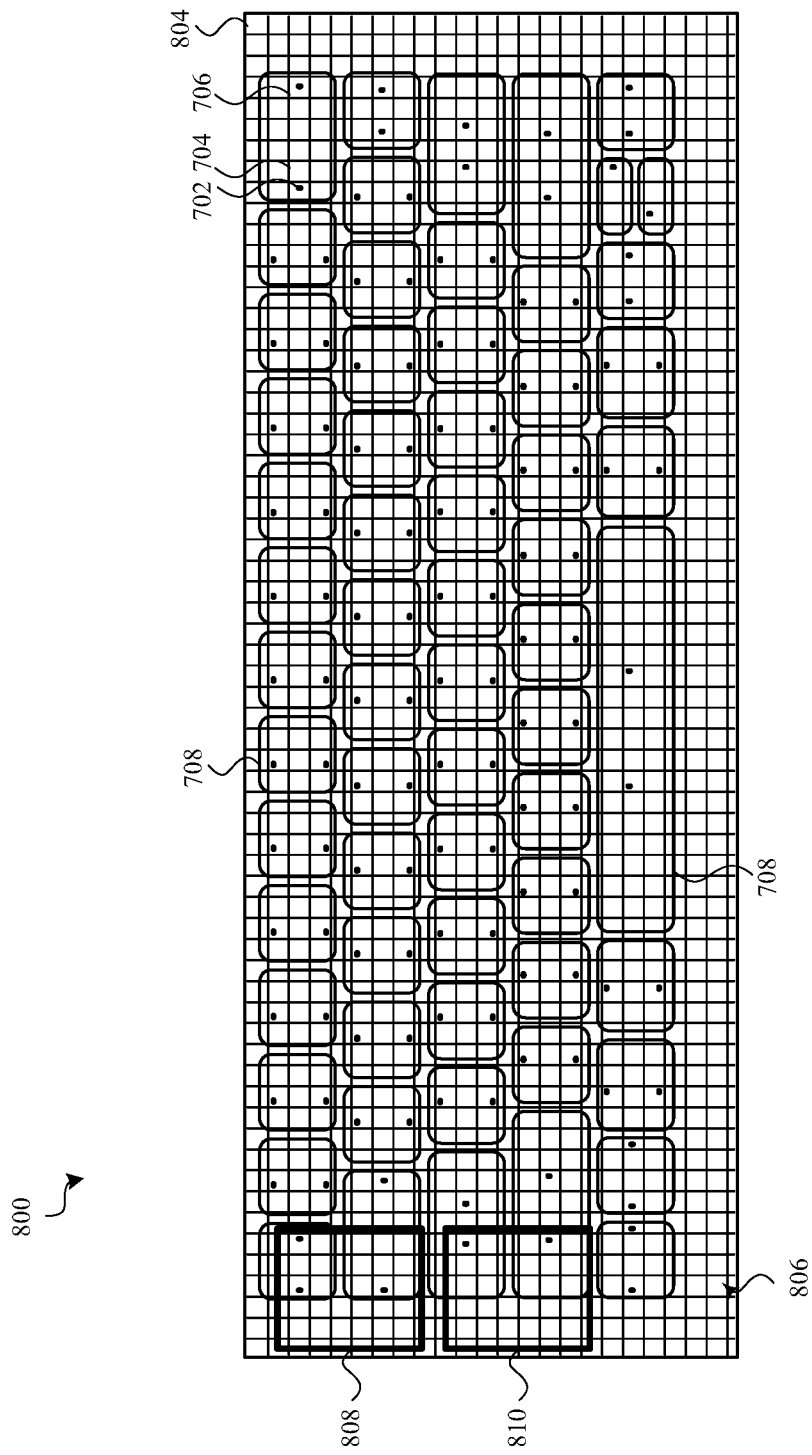
FIGS. 8 and 9 show modified versions of the keyboard described with reference to FIG. 7.

FIG. 8 shows a modified version 800 of the keyboard shown in FIG. 7, in which an array of electrodes 802 includes electrodes 702, 704, 706 positioned at least partly under the keycaps 708 and electrodes 804 positioned at least partly under a bezel 806 that is adjacent to (or surrounds) the keycaps 708. The keycaps 708 and bezel 806 may all be formed of non-conductive or dielectric materials, such as one or more polymers (e.g., one or more plastics). Alternatively, one or both of the keycaps 708 and bezel 806 may include conductive materials (e.g., one or more metals), though this may reduce the sensitivity of gesture input detection.

Figure 9:
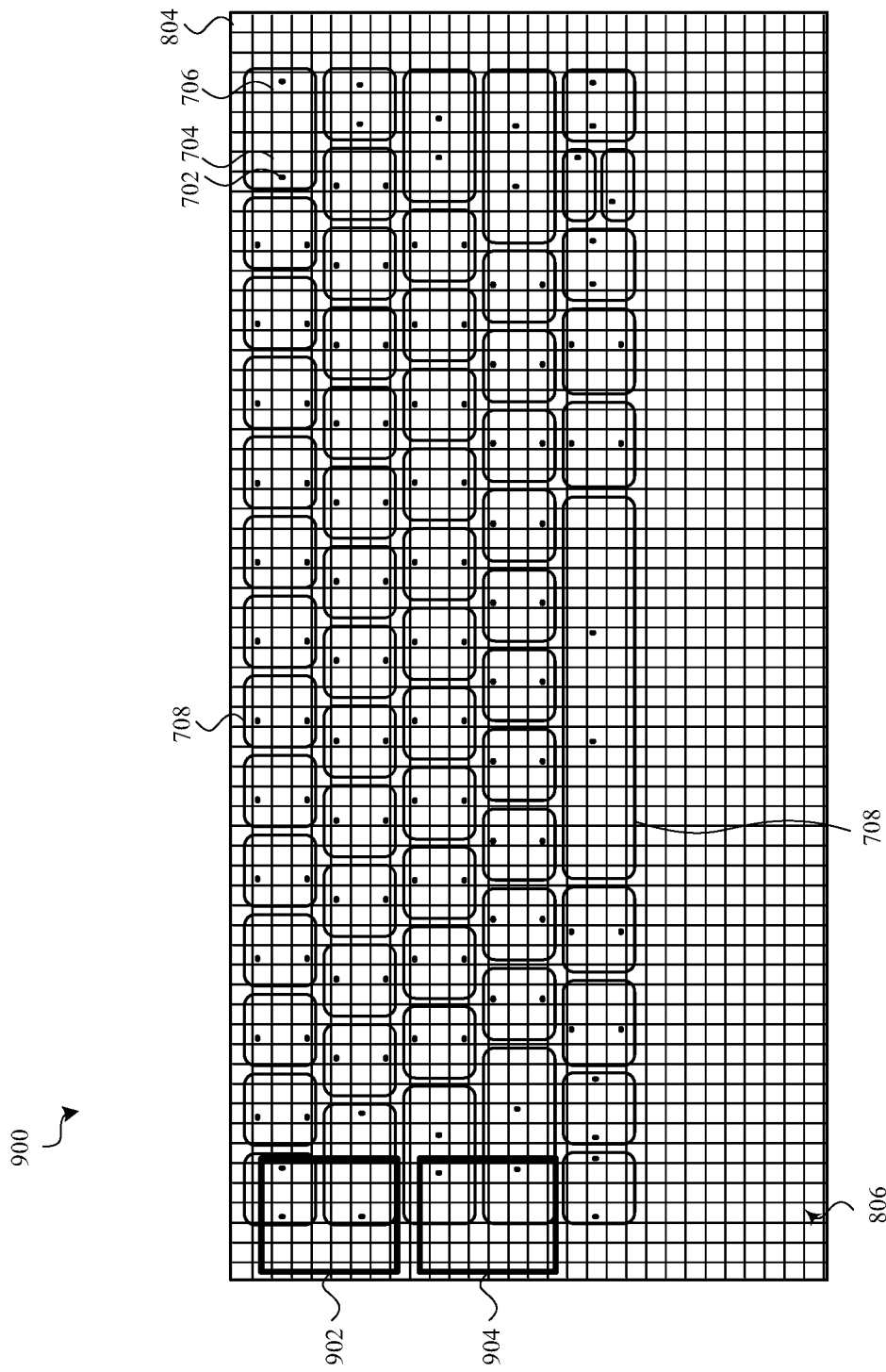

FIG. 9 shows a modified version 900 of the keyboard shown in FIG. 8, in which the portion of the bezel 806 positioned below the lower row of keys on the keyboard 900 is larger and provides a potential palm rest for a user.

The keyboards shown in FIGS. 8 and 9 may be used similarly to the keyboard shown in FIG. 7, to detect one or both of key input and gesture input. However, by expanding the array of electrodes 802 to include electrodes 804 extending partially or fully under the bezel 806, the keyboards 800, 900 may also detect gesture input provided over the bezel 806.

All of the keyboards described with reference to FIGS. 7-9, but particularly the keyboard described with reference to FIG. 9, may also be used to detect the position(s) of one or more body parts that are positioned over the keyboard. For example, the keyboards may be used to detect the positions of a user's fingers, finger segments, palms, hands, or wrists.

In some embodiments, a gesture input or position of a body part may be identified by a processor 710, 808, or 902 or other circuitry that is integrated with the keyboard 700, 800, or 900 (see, FIGS. 7-9) or a device that includes the keyboard 700, 800, or 900 (see, FIG. 1). In some embodiments, a communications interface 712, 810, or 904 of the keyboard 700, 800, or 900 may provide digitized values corresponding to measured capacitances to a remote device for identifying a gesture input or position of a body part. Similarly, key make/break events may be identified by a local processor 710, 808, or 902 or other circuitry, or digitized values corresponding to measured capacitances may be transmitted to a remote device, via the communications interface 712, 810, or 904, for making such determinations. Switching decisions, for switching between a key input mode and a gesture input mode, may also be made locally or remotely.

In some embodiments, a portion of the bezel 806 may be designated as a particular type of virtual input device (e.g., a slider, a button, and so on), and providing a predetermined type of gesture input on or over the designated portion of the bezel 806 may change a state of (or operate) the virtual input device. In some embodiments, different portions of the bezel 806 may be associated with different virtual input devices. A virtual input device may be associated with a particular function (e.g., turning the keyboard on or off, or adjusting a volume), or a virtual input device may have a programmable function, or a function that varies with the context of an electronic device (e.g., which application is active, what the user is doing, and so on).

A keyboard, as described herein, may in some cases be switched between a key input mode and a gesture input mode manually. For example, the keyboard may have a switch that can be touched, pressed, or toggled to switch the keyboard between the key input mode and the gesture input mode. Additionally or alternatively, the keyboard may be switched between the key input mode and the gesture input mode by a predetermined (or programmable) sequence of keystrokes that a user is unlikely to make unless done so intentionally, or by a gesture input made over the bezel of the keyboard, or by a gesture input made over the keycaps and/or bezel. However, a gesture input made over the keycaps may have to be complex or distinctive enough that it can be readily discerned from finger and hand movements that a user might make while providing key input (e.g., a gest input that is readily discernible from movements the user may make while pausing or thinking between keystrokes. Additionally or alternatively, the keyboard may be switched between the key input mode and the gesture input mode by virtue of the type of object that is touching or hovering above the keyboard. For example, a user may make a gesture on or over the keyboard with their fingernail, a stylus, or while wearing a glove. Doing so may change the range of capacitances that are obtained from the keyboard's electrodes, and may signify that the user wants to operate the keyboard in the gesture input mode. Additionally or alternatively, the keyboard may be switched from the key input mode to the gesture input mode automatically, through automatic recognition of a user's key input and gesture input. The keyboard may then be switch from the gesture input mode to the key input mode by means of the user pressing a keycap, causing a key make, or by means of the user providing a predetermined gesture input, for example.

In some cases, a keyboard may be switched between a key input mode and a gesture input mode based on factors such as user hand placement over the keyboard. For example, if the user's hands are placed in a typical typing position for the user, or for the general population, gesture input recognition may be suppressed.

In some cases, the events (e.g., gesture inputs, commands corresponding to gesture inputs, and so on) identified by a processor in response to the processor detecting objects (e.g., body parts, gloves, styluses, and so on) proximate to or hovering over a keyboard may change depending on the timing of keyboard interaction or the position(s) of the objects. As an example of keyboard interaction timing, a processor may have a propensity to identify gesture inputs, which propensity is reduced after a keypress (i.e., a key make). The reduced propensity to identify gesture inputs may decay, over time, to a normal propensity. Additional keypresses, however, may restore the reduced propensity to identify gesture input. The propensity of a processor to identify gesture inputs in response to keypresses may be quantified, for example, by a keypress_burstiness variable.

As an example of positional suppression of gesture input, gesture input that is outside of a certain region, such as an ellipse defined over the center of a keyboard, may be suppressed. The positional suppression may be based on a positional_suppression variable that identifies the extent of the certain region.

The keypress_burstiness variable and positional_suppression variable may in some cases be combined to suppress or identify gesture input. For example, upon detecting movement of one or more objects (e.g., one or more fingers, a stylus, etc.) that are in contact with, or in close proximity to, one or more keys of a keyboard, a processor may partially or fully suppress gesture input detection when it is determined that the keypress_burstiness variable, the positional_suppression variable, or some combination thereof is too great.

Figure 10:
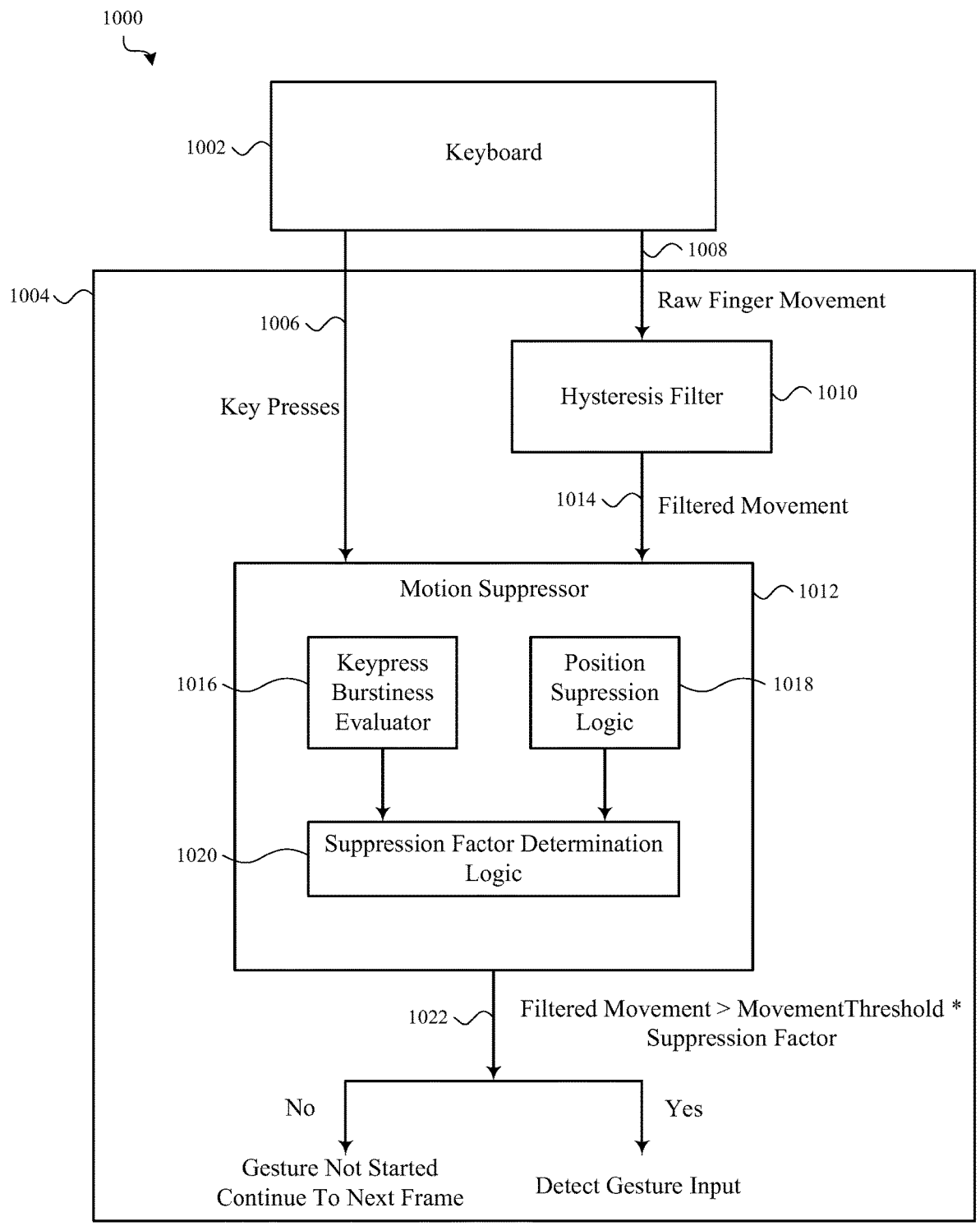
FIG. 10 shows an example means for switching a keyboard (or other input device) between a key input mode and a gesture input mode.

FIG. 10 shows an example means 1000 for switching a keyboard 1002 (or other input device) between a key input mode and a gesture input mode. The means 1000 may include a processor 1004 that is local to (on-board) the keyboard 1002 or remote from the keyboard 1002. The processor 1004 may receive indications of keypresses (key makes and brakes) 1006 from the keyboard 1002, and may also receive a set of capacitance measurements (e.g., digital values corresponding to analog capacitance measurements) or movement data 1008 from the keyboard 1002. The capacitance measurements (e.g., self-capacitance measurements) may be indicative of raw finger or body part movement on, or over, the keyboard 1002. The movement data 1008 may include indications of finger or body part movement on, or over, the keyboard 1002. When the processor 1004 receives the capacitance measurements, the processor 1004 may generate the movement data 1008 from the capacitance measurements.

In some cases, the movement data 1008 may be processed by a hysteresis filter 1010. The hysteresis filter 1010 may track the position of a finger over time, and may determine a radius or zone around the finger. The radius or zone may be sized smaller (in discrete steps, or in a continuously variable way) when the finger is stationary or moving less, and may be sized larger (in discrete steps, or in a continuously variable way) as the finger moves more, in accord with a hysteresis factor. When finger movement that exceeds the current radius or zone is detected by the hysteresis filter 1010, within the movement data 1008, the finger movement may be passed to a motion suppressor 1012 as filtered movement data 1014. Otherwise, the finger movement may be discarded or suppressed. Alternatively, the entirety of the movement data 1008 may be passed to the motion suppressor 1012 without passing through a hysteresis filter.

The motion suppressor 1012 may use the keypresses 1006 to determine a keypress burstiness. In some cases, this may be done by a keypress burstiness evaluator 1016 of the motion suppressor 1012 determining a value for a keypress_burstiness variable. Position suppression logic 1018 of the motion suppressor 1012 may use the filtered movement data 1014 (or alternatively, the movement data 1008) to determine a movement suppression region for which gesture input determinations are suppressed. In some cases, this may be done by determining a value for a positional_suppression variable. Logic 1020 (e.g., suppression factor determination logic) used by the motion suppressor 1012 may use the keypress burstiness and identified movement suppression region to determine suppression factor (e.g., suppression_factor). In some cases, the logic 1020 may determine a suppression factor as suppression_factor=max(keypress_burstiness, positional suppression). The motion suppressor 1012 may use the suppression factor to further filter the filtered movement data 1014, or to filter the movement data 1008. For example, the logic 1020 may output filtered movement data 1022 that exceeds a movement threshold times the suppression factor (e.g., Filtered Movement>MovementThreshold*suppression_factor).

If the filtered movement data 1022 is a null set, the processor 1004 may determine that a gesture has not started and analyze a next frame (e.g., a moving window frame) of keypresses 1006 and filtered movement data 1014 (or movement data 1008). If the filtered movement data 1022 is other than a null set, the processor 1004 may attempt to detect gesture input contained within the filtered movement data 1022.

As an alternative or supplement to what is described with reference to FIG. 10, a keyboard may be switched between a key input mode and a gesture input mode based on the identification of two finger movement. For example, a processor may detect, from changes in capacitance measurements, the positions and movements of two fingers. Two fingers may be moved together to provide some gesture input, or two fingers may be moved in different directions to provide other gesture input. As an example, two fingers may be placed at a first location on a keyboard to begin a gesture, or to define a first endpoint for a cursor or marker location. The two fingers may then be moved to a second location to end the gesture, or swiped to a second location to define a second endpoint for the cursor or marker (e.g., to select a block of text displayed on a computer screen).

In some embodiments, a keyboard may be placed in a learning mode. In the learning mode, a user may make predetermined gestures on or over the keyboard, and a processor may associate the user's movements with the predetermined gestures to "learn" how the user makes the predetermined gestures. Additionally or alternatively, the user may make predetermined or random gestures on or over the keyboard, and a processor may associate the predetermined or random gestures with respective commands or operations defined by a computing system or by the user. In some embodiments, a gesture made by a user while the keyboard is in the learning mode may be displayed on a computer screen.

Gesture input may take various forms. The following is a non-limiting list of example gesture input that can be used to select text on a screen:

(1) Touching and holding two fingers on a keyboard for a predetermined amount of time (e.g., two seconds). The fingers may be positioned together or apart, depending on how a system is configured.
(2) Placing two or more fingers on or over a keyboard and then spreading the fingers apart.
(3) Double-tapping a keycap or bezel of a keyboard without depressing the keycap.

(4) Moving one or more fingers in a cyclic hovering motion, on or over a keyboard, to move a cursor or marker on a computer screen, and tapping a keycap or other surface of the keyboard when the cursor or marker is proximate to a text selection icon.

(5) Horizontally sliding two fingers across a portion of a keyboard (e.g., across the keyboard's keycaps or bezel).

(6) Entering a text selection mode by providing a first gesture input to enable a text marker insertion mode, and then performing a further gesture.

(7) Entering a text selection mode by waving a hand proximate to a keyboard (e.g., in a bottom-to-top or top-to-bottom motion, or other motion, starting over a bezel of the keyboard), and then performing a further gesture.

(8) Sliding a finger along a bezel of a keyboard, from side-to-side or top-to-bottom, or bottom-to-top.

In some embodiments, a keyboard may include a set of electrodes as described herein, with some or all of the electrodes being capable of detecting a nearby object in a self-capacitance sensing mode (e.g., some or all of the electrodes may be operable as proximity sensors) and/or detecting a keycap movement in a mutual-capacitance sensing mode (e.g., some or all of the electrodes may be operable as make/break sensors or keypress sensors). In some cases, the self-capacitance sensing mode and the mutual-capacitance sensing mode may be employed contemporaneously. A segmentation unit may evaluate self-capacitance measurements (or other measurements) obtained from the electrodes or sensors, and segment the measurements into groups. An identification unit may associate each group of self-capacitance measurements with a different respective body part (e.g., finger, palm, and so on) or other object. In some cases, the segmentation and identification units may be collapsed into one unit. A placement unit may determine the position(s), and in some cases the displacement, of the different body parts. A discrimination unit may determine whether a movement of one or more body parts is indicative of a key input or a gesture input. In some cases, the segmentation unit, identification unit, placement unit, and/or discrimination unit may be instantiated by a specially-programmed processor.

In some embodiments, a main or system processor of a keyboard, which processor may sometimes be referred to as an applications processor, can enter a low-power or "sleep" state when the keyboard is not in active use, to reduce power consumption. Completing a transition from a sleep state to a wake state, suitable for active use of the device (also referred to as "waking" the processor), may have some associated latency. Accordingly, it may be desirable to start waking the processor as soon as a user's hand is detected in proximity to the keyboard, without also waking other user interface components of the keyboard. In some embodiment, a detection algorithm may detect the probable beginning of a gesture and initiate a waking of the processor. This operation can provide a faster response time when the user hits a key or performs an intentional gesture. A detection algorithm used to wake a processor may operate generally independently of (and in some cases currently with) a gesture input detection algorithm. For example, the two algorithms may perform different analyses on the same received data.

In an accessibility mode example, a device in accessibility mode may display an application launcher screen including a plurality of application icons. A respective application icon may correspond to a respective application (e.g., an application stored on the device or hosted by a remote server). The device may detect a sequence of one or more gesture inputs on a keyboard (e.g., on the keycaps or bezel of the keyboard). A gesture input that corresponds to a respective application may be a finger gesture that moves across or over the keyboard, along a path that corresponds to (e.g., terminates at) a location corresponding to the respective application. Upon detecting a gesture input that corresponds to a respective application, the device may perform a predetermined operation associated with the respective application's icon (e.g., launching the application).

In another example, when a device is in a screen reader accessibility mode, tapping but not depressing a key may trigger a voice output module to describe the key. If the key is then depressed to a key make state, the device may implement the functionality associated with the key.

In some cases, a keyboard capable of detecting self-capacitances of an array of under-key electrodes may be used to implement a point and click interface, where the pointing action is directed by hovering a finger proximate to the surface, and the clicking is performed by touching a surface of the keyboard (e.g., a keycap or bezel). In another example, such a keyboard may be used to enable mouse-over pop-ups when a user pauses on or over the surface of the keyboard. In another example, the keyboard may be used to provide tooltips with a preview function. In a more specific example, text can be selected by maneuvering a finger over the keyboard and bezel while noting the position on a screen, and then brushing the finger over the screen in contact with the surface to select the corresponding text. In some embodiments, the keyboard may be used to activate or change a state of one or more graphical user interface (GUI) objects displayed on a computer screen, and to emulate functions performed by a mouse or trackball input device.

In some embodiments, multiple gesture inputs (or touch inputs) occurring at about the same time may be received on a keyboard to generate first gesture input or touch data. Secondary sense data can then be combined with the first data to perform operations on a device. The first data and the secondary sense data can be time-aligned and interpreted in a time-coherent manner. The first data can be refined in accordance with the secondary sense data or, alternatively, the secondary sense data can be interpreted in accordance with the first data. Additionally, the first data and the secondary sense data can be combined to provide a command. As an example, the position of one hand hovering over a keyboard may change the functionality of a key make. In a further example, if both hands are in place over a keyboard, a gesture may be ignored, anticipating that key makes are intended, rather than gestures. In another example, a gesture over the keyboard may enable the system to change to a different keyboard mapping, enabling easy typography for two or more languages having different characters and/or keyboard formats. In a further example, a gesture or position of one hand may enter a key with a selected accent, for instance an umlaut. A gesture or position of a hand may result in the associated application entering a paragraph in response to a return key rather than a line break.

In some embodiments, the detection of finger pinch, rotate, or tap gesture inputs along with a translation, and optionally a liftoff motion, may initiate one or more actions. To detect both the gesture input and the translation, an amount of gesture scaling speed can be detected along with an amount of translation speed and distance traveled. For a finger pinch gesture input, for example, the scaling speed may be computed as the dot product of the velocity vectors of two or more fingers coming together. For a finger rotation gesture input, the scaling speed can be computed as a cross product of the velocity vectors of the rotating fingers. The translation speed of a gesture input can be computed as the average of the velocity vectors of any fingers involved in the gesture input. The amount of gesture scaling speed and translation speed needed to trigger the recognition of a gesture input combined with a translation can be a predetermined ratio.

In some embodiments, a gesture input (or a gesture input of a particular type) may be accompanied by a change in the illumination or symbology (e.g., characters) displayed on (or through) one or more keycaps of a keyboard. As an example, a gesture input may trigger illumination of relevant key patterns for a combination. In another example, the keycaps may display different symbols such as accented characters or symbols of different languages when activated by a gesture input. A keycap's displayed imagery may in some cases be provided by a display located under the keycap (or under a key).

In some embodiments, a proximity-sensing, multi-touch keyboard may be used to contemporaneously track multiple finger and palm contacts as hands approach, touch, and slide on or above the keycaps and/or bezel of the keyboard. Identification and classification of intuitive hand configurations and motions can enable the integration of typing, resting, pointing, scrolling, 3D manipulation, and handwriting operations into a single input device.

Figure 11:
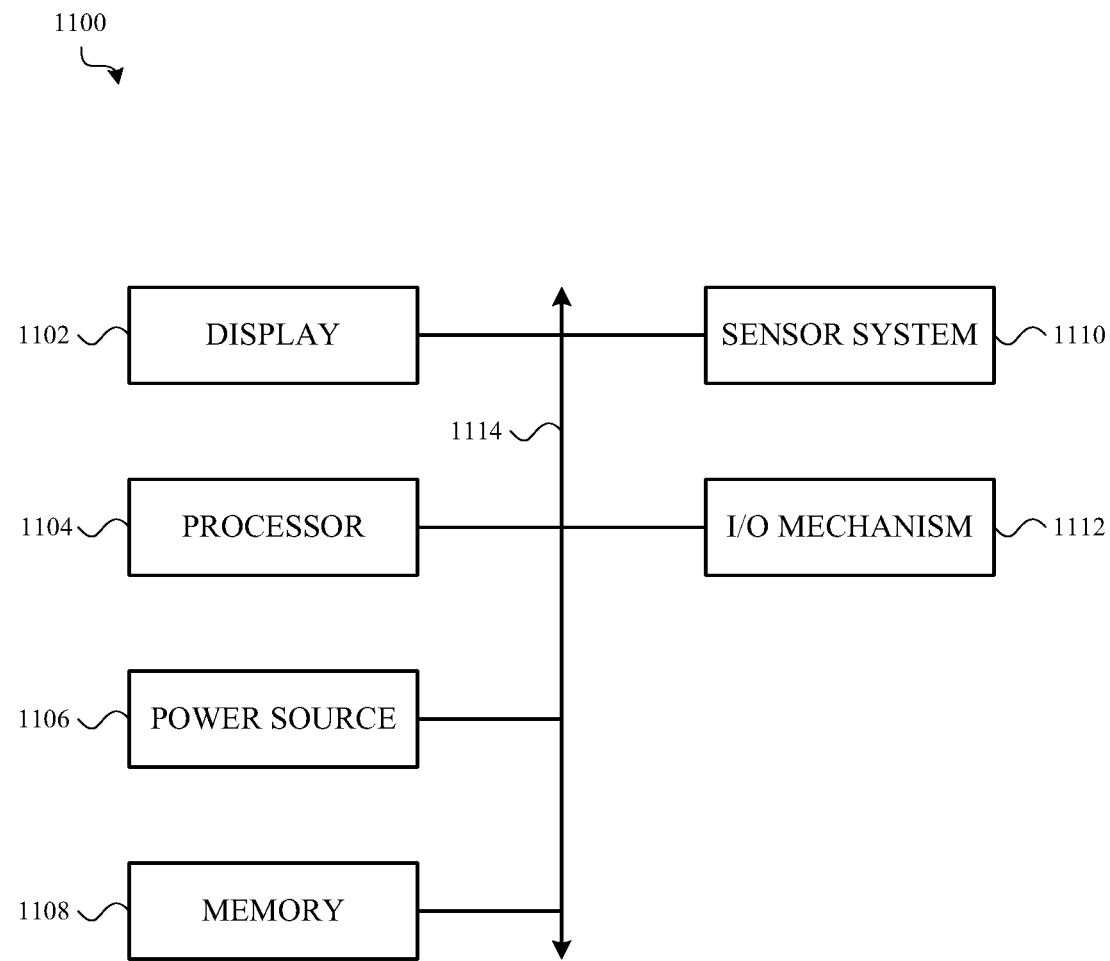
FIG. 11 shows a sample electrical block diagram of an electronic device that includes a keyboard.

FIG. 11 shows a sample electrical block diagram of an electronic device 1100 that includes an input device or keyboard, such as the input device or keyboard described with reference to any of FIGS. 1A-5F, and 7-10. The electronic device 1100 may take forms such as a laptop computer, a standalone keyboard, and so on. The electronic device 1100 may include an optional display 1102 (e.g., a light-emitting display), processor 1104, power source 1106, memory 1108 or storage device, sensor system 1110, and/or input/output (I/O) mechanism 1112 (e.g., an input/output device and/or input/output port). The processor 1104 may control some or all of the operations of the electronic device 1100. The processor 1104 may communicate, either directly or indirectly, with substantially all of the components of the electronic device 1100. For example, a system bus or other communication mechanism 1114 may provide communication between the processor 1104, the power source 1106, the memory 1108, the sensor system 1110, and/or the input/output mechanism 1112.

The processor 1104 may be implemented as any electronic device capable of processing, receiving, or transmitting data or instructions. For example, the processor 1104 may be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. In some cases, the processor 1104 may encompass components for converting digital signals to analog signals (e.g., a digital-to-analog converter (DAC) for generating drive signals) or analog signals to digital signals (e.g., an analog-to-digital converter (ADC) for generating digital sensor readings).

In some embodiments, the components of the electronic device 1100 may be controlled by multiple processors. For example, select components of the electronic device 1100 may be controlled by a first processor and other components of the electronic device 1100 may be controlled by a second processor, where the first and second processors may or may not be in communication with each other.

The power source 1106 may be implemented with any device capable of providing energy to the electronic device 1100. For example, the power source 1106 may include one or more disposable or rechargeable batteries. Additionally or alternatively, the power source 1106 may include a power connector or power cord that connects the electronic device 1100 to another power source, such as a wall outlet.

The memory 1108 may store electronic data that may be used by the electronic device 1100. For example, the memory 1108 may store electrical data or content such as, for example, audio and video files, documents and applications, device settings and user preferences, timing signals, control signals, data structures or databases, or image data. The memory 1108 may be configured as any type of memory. By way of example only, the memory 1108 may be implemented as random access memory, read-only memory, Flash memory, removable memory, other types of storage elements, or combinations of such devices.

The electronic device 1100 may also include one or more sensors defining the sensor system 1110. The sensors may be positioned substantially anywhere on the electronic device 1100. The sensor(s) may be configured to sense substantially any type of characteristic, such as but not limited to, touch, force, pressure, electromagnetic radiation (e.g., light), heat, movement, relative motion, biometric data, distance, and so on. For example, the sensor system 1110 may include a touch sensor, a force sensor, a heat sensor, a position sensor, a light or optical sensor, an accelerometer, a pressure sensor (e.g., a pressure transducer), a gyroscope, a magnetometer, a health monitoring sensor, an image sensor, and so on. Additionally, the one or more sensors may utilize any suitable sensing technology, including, but not limited to, capacitive, ultrasonic, resistive, optical, ultrasound, piezoelectric, and thermal sensing technology. In some embodiments, one or more sensors may be integrated with (or associated with) one or more keys on a keyboard. For example, the sensor(s) may detect user interaction with a surface of a key and/or a position or movement of the key.

The I/O mechanism 1112 may transmit and/or receive data from a user or another electronic device. An I/O device may include a display, a touch sensing input surface such as a track pad, one or more buttons (e.g., a graphical user interface "home" button, or one of the buttons described herein), one or more cameras (including one or more image sensors), one or more microphones or speakers, one or more ports such as a microphone port, and/or a keyboard. Additionally or alternatively, an I/O device or port may transmit electronic signals via a communications network, such as a wireless and/or wired network connection. Examples of wireless and wired network connections include, but are not limited to, cellular, Wi-Fi, Bluetooth, IR, and Ethernet connections. The I/O mechanism 1112 may also provide feedback (e.g., a haptic output) to a user.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. An input device, comprising:
   a keycap;
   a first electrode disposed to move in response to movement of the keycap;
   a planar array of electrodes extending at least partially under the keycap and including,
      a second electrode;
      a third electrode; and
      a fourth electrode extending between the second electrode and the third electrode; and
   a sensor coupled to at least one of the second electrode or the third electrode and configured to generate a signal indicative of a change in capacitive coupling between the second electrode and the third electrode resulting from movement of the first electrode.

2. The input device of claim 1, wherein the fourth electrode surrounds the second electrode.

3. The input device of claim 2, wherein the third electrode surrounds the fourth electrode.

4. The input device of claim 2, wherein the second electrode is a drive electrode and the third electrode is a sense electrode.

5. The input device of claim 2, wherein the second electrode is a sense electrode and the third electrode is a drive electrode.

6. The input device of claim 1, wherein the fourth electrode is electrically biased to provide electrical shielding between the second electrode and the third electrode.

7. The input device of claim 1, further comprising:
   a processor configured to use the second electrode, the third electrode, and the fourth electrode in a first mode during a first set of time periods, and in a second mode during a second set of time periods; wherein,
   in the first mode, the second electrode is driven with a modulated drive signal while the sensor generates the signal indicative of the change in capacitive coupling between the second electrode and the third electrode.

8. The input device of claim 1, further comprising:
   a feature plate;
   a circuit board disposed on a first side of the feature plate and including the planar array of electrodes; and
   a dielectric keycap retainer attaching the keycap to the feature plate; wherein,
   the dielectric keycap retainer biases the keycap toward an extended position, and allows the keycap to move toward a pressed position in response to a force applied to the keycap.

9. The input device of claim 1, further comprising:
   a set of sensors coupled to at least the third electrode or the fourth electrode, with each sensor in the set of sensors being configured to generate a self-capacitance measurement.

10. The input device of claim 1, wherein:
    the keycap is a first keycap in a set of keycaps;
    the planar array of electrodes comprises an array of electrodes, including electrodes disposed under multiple keycaps in the set of keycaps; and
    the input device further comprises a set of sensors coupled to the array of electrodes, with each sensor in the set of sensors being configured to measure a self-capacitance of an electrode in the array of electrodes.

11. The input device of claim 10, further comprising:
    a bezel adjacent the set of keycaps; wherein,
    the planar array of electrodes extends under the bezel.

12. An input device, comprising:
    a plate;
    a circuit board disposed on a first side of the plate;
    a keycap disposed on a second side of the plate; and
    a dielectric keycap retainer attaching the keycap to the plate; wherein,
    the dielectric keycap retainer comprises a flipper, the flipper having an end that moves away from the circuit board when a force is applied to the keycap, and toward the circuit board when the force is removed from the keycap; and
    an electrically floating electrode is attached to the end of the flipper.

13. The input device of claim 12, wherein:
    the circuit board comprises an array of electrodes, including,
       a drive electrode; and
       a sense electrode; and
    movement of the keycap toward or away from the circuit board causes a change in,
       a first capacitance between the electrically floating electrode and the drive electrode; and
       a second capacitance between the electrically floating electrode and the sense electrode.

14. The input device of claim 13, wherein:
    the drive electrode is positioned at least partially under the keycap; and
    the sense electrode is positioned at least partially under the keycap.

15. The input device of claim 13, wherein:
    the array of electrodes further comprises an electrical shield electrode; and
    the electrical shield electrode is disposed between the drive electrode and the sense electrode, and at least partially under the electrically floating electrode.

16. The input device of claim 13, wherein:
    the end of the flipper, the electrically floating electrode, the drive electrode, and the sense electrode are a first end of the flipper, a first electrically floating electrode, a first drive electrode, and a first sense electrode;
    the flipper has a second end that moves toward the circuit board when the force is applied to the keycap, and away from the circuit board when the force is removed from the keycap;
    the input device further comprises a second electrically floating electrode attached to the second end of the flipper;
    the array of electrodes further comprises:
       a second drive electrode; and
       a second sense electrode; and
    the movement of the keycap toward or away from the circuit board causes a change in,
       a third capacitance between the second electrically floating electrode and the second drive electrode; and
       a fourth capacitance between the second electrically floating electrode and the second sense electrode.

17. The input device of claim 12, wherein:
    the circuit board comprises an array of electrodes, including,
       a drive electrode; and
       a sense electrode; and
    movement of the keycap toward or away from the circuit board changes a capacitive coupling between the drive electrode and the sense electrode.

18. The input device of claim 12, wherein:
    the electrically floating electrode is a first electrically floating electrode; and a second electrically floating electrode is attached to the end of the flipper and spaced apart from the first electrically floating electrode.

19. A capacitive input device, comprising:
a plate;
a circuit board disposed on a first side of the plate;
a keycap disposed on a second side of the plate;
a dielectric keycap retainer attaching the keycap to the plate;
a first electrode attached to the dielectric keycap retainer and disposed to move in response to movement of the keycap;
a second electrode attached to the circuit board and positioned at least partially under the keycap;
a deformable member providing a mechanical resistance to depression of the keycap; and
a sensor configured to output a signal indicative of movement of the first electrode with respect to the second electrode.

20. The capacitive input device of claim 19, wherein the deformable member comprises a collapsible dome.

21. The capacitive input device of claim 19, wherein:
the dielectric keycap retainer is separate from the deformable member.

22. The capacitive input device of claim 21, wherein the plate is a dielectric.

23. The capacitive input device of claim 19, further comprising:
a third electrode disposed to move in response to movement of the keycap; and
a fourth electrode attached to the circuit board and positioned at least partially under the keycap; wherein,
the sensor is configured to output a second signal indicative of movement of the third electrode with respect to the fourth electrode.

24. An input device, comprising:
a set of keys having a set of movable keycaps;
a first array of electrodes attached to the set of movable keycaps;
a second array of electrodes disposed below the set of movable keycaps;
a first set of sensors coupled to the second array of electrodes and configured to generate mutual capacitance measurements;
a second set of sensors coupled to the second array of electrodes and configured to generate self-capacitance measurements; and
a processor configured to,
segment the self-capacitance measurements into groups; and
associate each group of self-capacitance measurements with a different respective body part of a user.

25. The input device of claim 24, further comprising:
a bezel adjacent the set of keys; wherein,
the second array of electrodes extends under the bezel.

26. The input device of claim 24, wherein:
the processor is configured to,
identify key make and key break events using at least the mutual capacitance measurements; and
identify gesture inputs using at least the self-capacitance measurements.

27. The input device of claim 26, wherein the processor is further configured to:
switch the input device between a key input mode and a gesture input mode in response to at least the self-capacitance measurements.

28. The input device of claim 26, wherein the processor is further configured to:
switch the input device between a key input mode and a gesture input mode in response to at least the self-capacitance measurements and the mutual capacitance measurements.

* * * * *